US009569101B2

(12) United States Patent
 Kim et al.

(10) Patent No.: US 9,569,101 B2
(45) Date of Patent: Feb. 14, 2017

(54) USER INTERFACE APPARATUS IN A USER TERMINAL AND METHOD FOR SUPPORTING THE SAME

(71) Applicant: Samsung Electronics Co. Ltd., Suwon-si, Gyeonggi-do (KR)

(72) Inventors: Hwa-Kyung Kim, Seoul (KR); Sung-Soo Kim, Bucheon-si (KR); Joo-Yoon Bae, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 304 days.

(21) Appl. No.: 14/015,046

(22) Filed: Aug. 30, 2013

(65) Prior Publication Data

US 2014/0068496 A1    Mar. 6, 2014

(30) Foreign Application Priority Data

Aug. 30, 2012  (KR) ........................ 10-2012-0095962

(51) Int. Cl.
  *G06F 3/048*  (2013.01)
  *G06F 3/0488*  (2013.01)
  *G06F 9/455*  (2006.01)
(52) U.S. Cl.
  CPC ....... *G06F 3/04883* (2013.01); *G06F 9/45512* (2013.01)
(58) Field of Classification Search
  USPC ....................................................... 715/780
  See application file for complete search history.

(56) References Cited

U.S. PATENT DOCUMENTS

| 2004/0240739 | A1* | 12/2004 | Chang et al. ................. 382/186 |
| 2008/0104020 | A1* | 5/2008 | Kato ................................ 707/3 |
| 2008/0174568 | A1* | 7/2008 | Kim ............................. 345/173 |
| 2008/0250012 | A1 | 10/2008 | Hinckley et al. |
| 2011/0307505 | A1 | 12/2011 | Ito |
| 2012/0064947 | A1 | 3/2012 | Yi et al. |
| 2012/0092508 | A1* | 4/2012 | Toriumi et al. ............ 348/207.1 |
| 2012/0174009 | A1 | 7/2012 | Kwon |

FOREIGN PATENT DOCUMENTS

| EP | 1 091 278 A2 | 4/2011 |
| KR | 10-2006-0028787 A | 4/2006 |
| WO | 2005/003944 A1 | 1/2005 |

* cited by examiner

*Primary Examiner* — Thanh Vu
(74) *Attorney, Agent, or Firm* — Jefferson IP Law, LLP

(57) ABSTRACT

A handwriting-based User Interface (UI) apparatus and a method for executing an intended function menu using notes stored in a user terminal supporting a handwriting-based memo function are provided, in which upon user request, a note that has been written by the memo function and stored is retrieved and displayed on a screen. A whole or part of the contents of the displayed note are selected by a first input form. The contents of a note written on the screen by the memo function is designated as a command to execute for the selected whole or part of the contents by a second input form different from the first input form. The selected whole or part of the contents are processed according to the command.

13 Claims, 35 Drawing Sheets

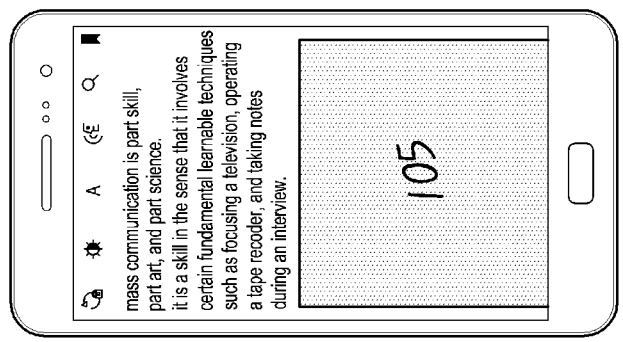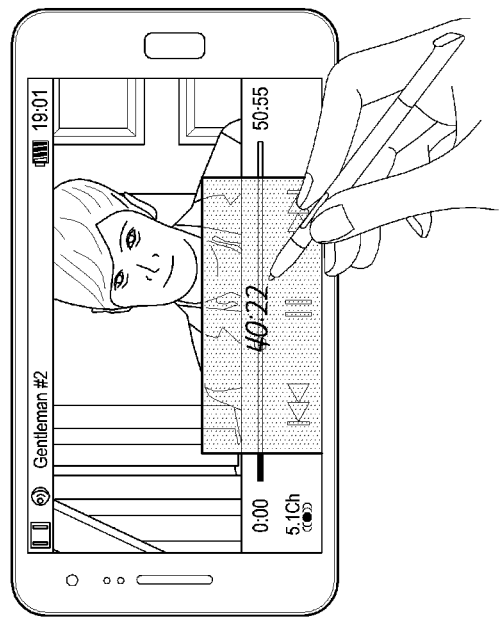
FIG.20

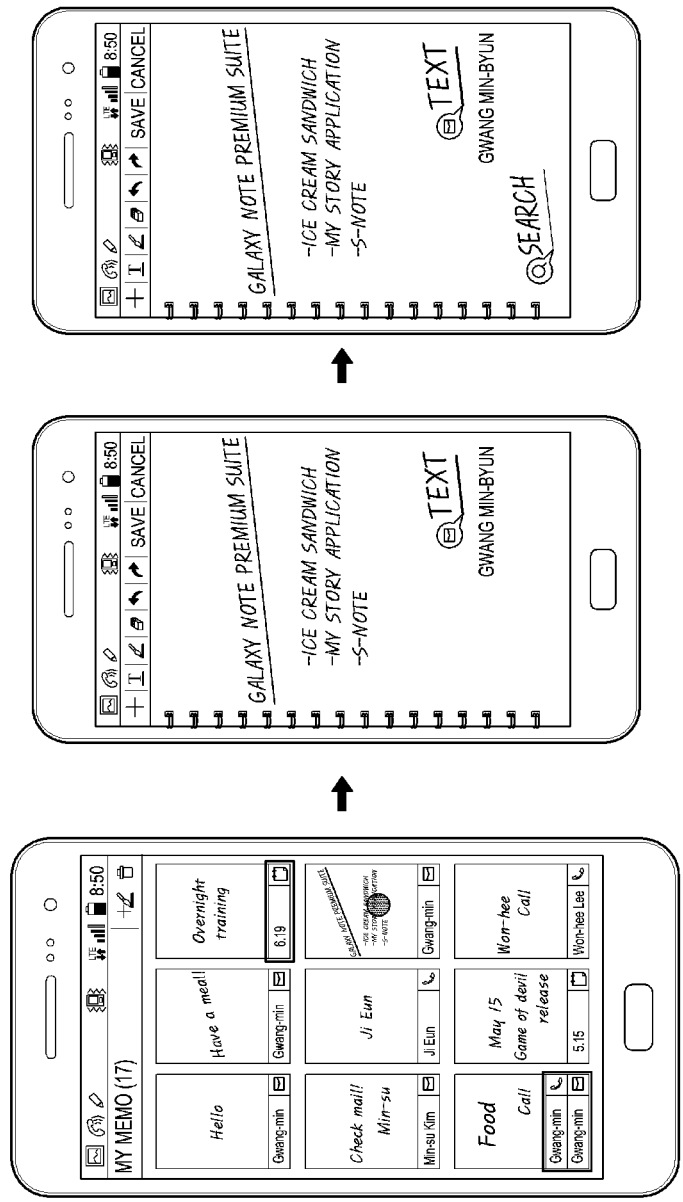

| POSITION | DESCRIPTION |
|---|---|
| COMMON GUI | GALAXY NOTE STANDARD RESOLUTION 1280*800 |
| 1 | DELETE SELECTED NOTES |
| 2 | SWITCH TO VIEW SCREEN |
| 3 | DELETION SCREEN FEEDBACK→ADD YES/NO POP-UP TO CONFIRM DELETION<br>- CHANGE BACKGROUND TO RED<br>- CHANGE OUTLINE OF SELECTED NOTE TO RED AND ACTIVATE CHECK | though a user terminal supports an
USER INTERFACE APPARATUS IN A USER TERMINAL AND METHOD FOR SUPPORTING THE SAME

CROSS-REFERENCE TO RELATED APPLICATION(S)

This application claims the benefit under 35 U.S.C. §119(a) of a Korean patent application filed on Aug. 30, 2012 in the Korean Intellectual Property Office and assigned Serial No. 10-2012-0095962, the entire disclosure of which is hereby incorporated by reference.

TECHNICAL FIELD

The present disclosure relates to a user interface apparatus in a user terminal and a method for supporting the same. More particularly, the present disclosure relates to a handwriting-based user interface apparatus in a user terminal and a method for supporting the same.

BACKGROUND

Along with the recent growth of portable electronic devices, user demand for User Interfaces (UIs) that enable intuitive input/output are on the increase. For example, traditional UI schemes using an additional device such as a keyboard, a keypad, a mouse, etc. for inputting information has gradually evolved to intuitive UI schemes for inputting information by directly touching a screen with a finger or a touch electronic pen or by voice.

In addition, the development trend of the UI technology is toward intuitive and human-centered UIs that enhance user convenience. In such a major UI technology, a user can make a dialog with a portable electronic device and input or acquire intended information by the dialog.

Typically, various applications are installed and new functions are available through the installed applications in a main portable electronic device, such as a smart phone.

However, as the installed applications are usually executed independently in the smart phone, a new function or result is not provided through interworking between a plurality of applications.

For example, even though a user terminal supports an intuitive UI in a scheduler application, a user can input information only through a UI supported by the scheduler application.

Moreover, with a user terminal supporting a memo function by means of a touch screen, a user takes a note using an input means such as a finger, an electronic pen, etc. without any specified method for using the contents of the note in conjunction with other applications.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide an apparatus and method for exchanging information with a user by means of a handwriting-based User Interface (UI) in a user terminal.

Another aspect of the present disclosure is to provide a UI apparatus for executing a specific command using a handwriting-based memo function in a user terminal and a method for supporting the same.

Another aspect of the present disclosure is to provide a UI apparatus for exchanging questions and answers using a handwriting-based memo function in a user terminal and a method for supporting the same.

Another aspect of the present disclosure is to provide a UI apparatus and method for receiving a command to process selected full or partial contents of a note displayed on a screen using a memo function in a user terminal.

Another aspect of the present disclosure is to provide a UI apparatus and method for supporting switching between a memo mode and a command processing mode in a user terminal supporting a memo function through an electronic pen.

Another aspect of the present disclosure is to provide a UI apparatus and method for enabling a user to input a command for controlling a specific application or another application during execution of the specific application in progress in a user terminal.

Another aspect of the present disclosure is to provide a UI apparatus and method for analyzing a user's memo pattern and determining information input by a memo function, taking into account the analyzed memo pattern in a user terminal.

A further aspect of the present disclosure is to provide a handwriting-based UI apparatus for executing an intended function menu using notes written in a personal terminal supporting a handwriting-based memo function, and a method for supporting the same.

In accordance with an aspect of the present disclosure, a UI method in a user terminal supporting a handwriting-based memo function is provided. The method includes, upon a user request, a note that has been written by the memo function and stored is retrieved and displayed on a screen, a whole or part of the contents of the displayed note are selected by a first input form, the contents of a note written on the screen by the memo function is designated as a command to execute for the selected whole or part of the contents by a second input form different from the first input form, and the selected whole or part of the contents are processed according to the command.

In accordance with another aspect of the present disclosure, a UI apparatus in a user terminal supporting a handwriting-based memo function is provided. The apparatus includes, upon a user request, a note that has been written by the memo function and stored is retrieved and displayed on a screen, a whole or part of the contents of the displayed note are selected by a first input form, the contents of a note written on the screen by the memo function is designated as a command to execute for the selected whole or part of the contents by a second input form different from the first input form, and the selected whole or part of the contents are processed according to the command.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following detailed description taken in conjunction with the accompanying drawings, in which:

FIGS. 18, 19, 20, 21, 22 and 23 illustrate scenarios of invoking an application supporting a memo function after a specific application is activated and then executing the activated application using the invoked application according to an embodiment of the present disclosure;

FIGS. 27A, 27B, and 27C illustrate an example of executing an intended function menu using notes written in a user terminal according to an embodiment of the present disclosure;

Throughout the drawings, like reference numerals will be understood to refer to like parts, components, and structures.

DETAILED DESCRIPTION

Figure 1:
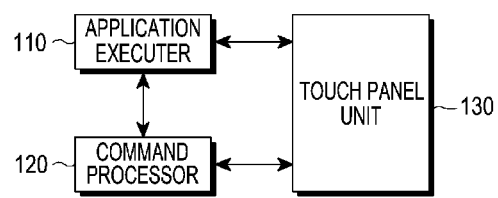
FIG. 1 is a block diagram of a user terminal for supporting handwriting-based Natural Language Interaction (NLI) according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Embodiments of the present invention disclosure described herein are intended to apply a handwriting-based User Interface (UI) technology as Natural Language Interaction (NLI) (hereinafter, referred to as 'handwriting-based NLI') to a user terminal and thus enable a question and answer procedure with a user by a memo function in the user terminal.

NLI generally involves understanding and creation. With the understanding and creation functions, an input is understood and text readily understandable to humans is displayed. Thus, it can be said that NLI is an application that enables a dialogue in a natural language between a human being and an electronic device.

For example, a user terminal executes a command received from a user or acquires information required to execute the input command from the user in a question and answer procedure through NLI.

To apply handwriting-based NLI to a user terminal, it is preferred that switching should be performed organically between memo mode and command processing mode through handwriting-based NLI in the present disclosure. The memo mode includes a state where the user terminal supports writing a note on a screen displayed by an activated application with an input means such as a finger or an electronic pen, whereas the command processing mode supports processing the note received in the memo mode in conjunction with information associated with the currently activated application.

For example, switching may occur between the memo mode and the command processing mode by pressing a button of an electronic pen, that is, by generating a signal in hardware.

While the following description is given in the context of an electronic pen being used as a major input means to support a memo function, the present disclosure is not limited to a user terminal using an electronic pen as an input means. In other words, it is to be understood that any means of inputting information on a touch panel can be used as an input means in all embodiments of the present disclosure.

In an implementation, information is shared between a user terminal and a user in a preliminary mutual agreement so that the user terminal may receive intended information from the user by exchanging a question and an answer with the user and thus may provide the result of processing the received information to the user through the handwriting-based NLI technology of the present disclosure. For example, it may be agreed that in order to request operation mode switching, at least one of a symbol, a pattern, text, and a combination thereof is used or a gesture is used by a gesture recognition function. Mainly, memo mode to command processing mode switching or command processing mode to memo mode switching may be requested.

In regard to agreement on input information corresponding to a symbol, a pattern, text, or a combination thereof, it is preferred to analyze a user's memo pattern and consider the analysis result, to thereby enable a user to intuitively input intended information with convenience.

Various scenarios of controlling a currently activated application by a memo function based on handwriting-based NLI and outputting a control result will be described in detail as separate embodiments of the present disclosure.

For example, a detailed description will be given of a scenario of selecting a whole or part of the contents of a note and processing the selected note contents according to a specific command, a scenario of inputting specific information to a screen of a specific application by a memo function, a scenario of processing a specific command in a question and answer procedure using handwriting-based NLI, etc.

Reference will be made to preferred embodiments of the present disclosure with reference to the attached drawings. A detailed description of a generally known function and structure of the present disclosure will be avoided lest it should obscure the subject matter of the present disclosure.

FIG. 1 is a schematic block diagram of a user terminal supporting handwriting-based NLI according to an embodiment of the present disclosure. While only components of the user terminal used to support handwriting-based NLI according to an embodiment of the present disclosure are shown in FIG. 1, it is obvious that components may be added to the user terminal in order to perform other functions. It is also possible to configure each component illustrated in FIG. 1 in the form of a software function block as well as a hardware function block.

Referring to FIG. 1, an application executer 110 installs an application received through a network or an external interface in conjunction with a memory (not shown), upon user request. The application executer 110 activates one of installed applications upon user request and controls the activated application according to an external command. The external command refers to almost any of externally input commands other than internally generated commands.

For example, the external command may be a command corresponding to information input through handwriting-based NLI by the user as well as a command corresponding to information input through a network. For convenience in description, the external command is limited to a command corresponding to information input through handwriting-based NLI by a user, which should not be construed as limiting the present disclosure.

The application executer 110 provides the result of installing or activating a specific application to the user through handwriting-based NLI. For example, the application executer 110 outputs the result of installing or activating a specific application on a display of a touch panel unit 130.

The touch panel unit 130 processes input/output of information through handwriting-based NLI. The touch panel unit 130 performs a display function and an input function. The display function generically refers to a function of displaying information on a screen and the input function generically refers to a function of receiving information from a user.

However, it is obvious that the user terminal may include an additional structure for performing the display function and the input function. For example, regarding the input function, the user terminal may further include a camera for sensing a gesture.

For convenience in description, the following description will be given with the appreciation that the touch panel unit 130 performs both the display function and the input function without its operation being separated into the display function and the input function.

The touch panel unit 130 recognizes specific information or a specific command received from the user and provides the recognized information or command to the application executer 110 and/or a command processor 120.

The information may be information about a note written by the user or information about an answer in a question and answer procedure based on handwriting-based NLI. Besides, the information may be information for selecting a whole or part of the contents of a note displayed on a current screen.

The command may be a command requesting installation of a specific application or a command requesting activation of a specific application from among already installed applications. In addition, the command may be a command requesting execution of a specific operation, function, etc. supported by a selected application.

The information or command may be input in the form of a line, a symbol, a pattern, or a combination of them as well as in text. Such a line, symbol, pattern, etc. may be preset by an agreement or learning.

The touch panel unit 130 displays the result of activating a specific application or performing a specific function of the activated application by the application executer 110 on a screen.

The touch panel unit 130 also displays a question or a result on a screen in a question and answer procedure. For example, when the user inputs a specific command, the touch panel unit 130 displays the result of processing the specific command, received from the command processor 120 or a question to acquire additional information required to process the specific command. Upon receipt of the additional information as an answer to the question from the user, the touch panel unit 130 provides the received additional information to the command processor 120.

Subsequently, the touch panel unit 130 displays an additional question to acquire other information upon request of the command processor 120 or the result of processing the specific command, reflecting the received additional information.

The command processor 120 receives a user-input text, symbol, figure, pattern, etc. from the touch panel unit 130 and identifies a user-intended input by the text, symbol, figure, pattern, etc.

For example, the command processor 120 may recognize the user-intended input by natural language processing of the received text, symbol, figure, pattern, etc. For the natural language processing, the command processor 120 employs handwriting-based NLI. The user-intended input includes a command requesting activation of a specific application or execution of a specific function in a current active application, or an answer to a question.

When the command processor 120 determines that the user-intended input is a command requesting a certain operation, the command processor 120 processes the determined command. Specifically, the command processor 120 commands the application executer 110 to activate a specific application or to execute a specific function of a current active application, according to the processed command. In this case, the command processor 120 receives a processed result from the application executer 110 and provides the processed result to the touch panel unit 130.

Obviously, the application executer 110 may provide the processed result directly to the touch panel unit 130, without making the processed result pass through the command processor 120.

If additional information is needed to process the determined command, the command processor 120 creates a question to acquire the additional information and provides the question to the touch panel unit 130. Then the command processor 120 may receive an answer to the question from the touch panel unit 130.

The command processor 120 may continuously exchange questions and answers with the user, that is, may continue a dialogue with the user through the touch panel unit 130 until acquiring sufficient information to process the determined command. That is, the command processor 120 may repeat the question and answer procedure through the touch panel unit 130.

To perform the above-described operation, the command processor 120 adopts handwriting-based NLI by interworking with the touch panel unit 130. That is, the command processor 120 enables questions and answers, that is, a dialogue between a user and an electronic device by a memo function through a handwriting-based natural language interface. The user terminal processes a user command or provides the result of processing the user command to the user in the dialogue.

Figure 2:
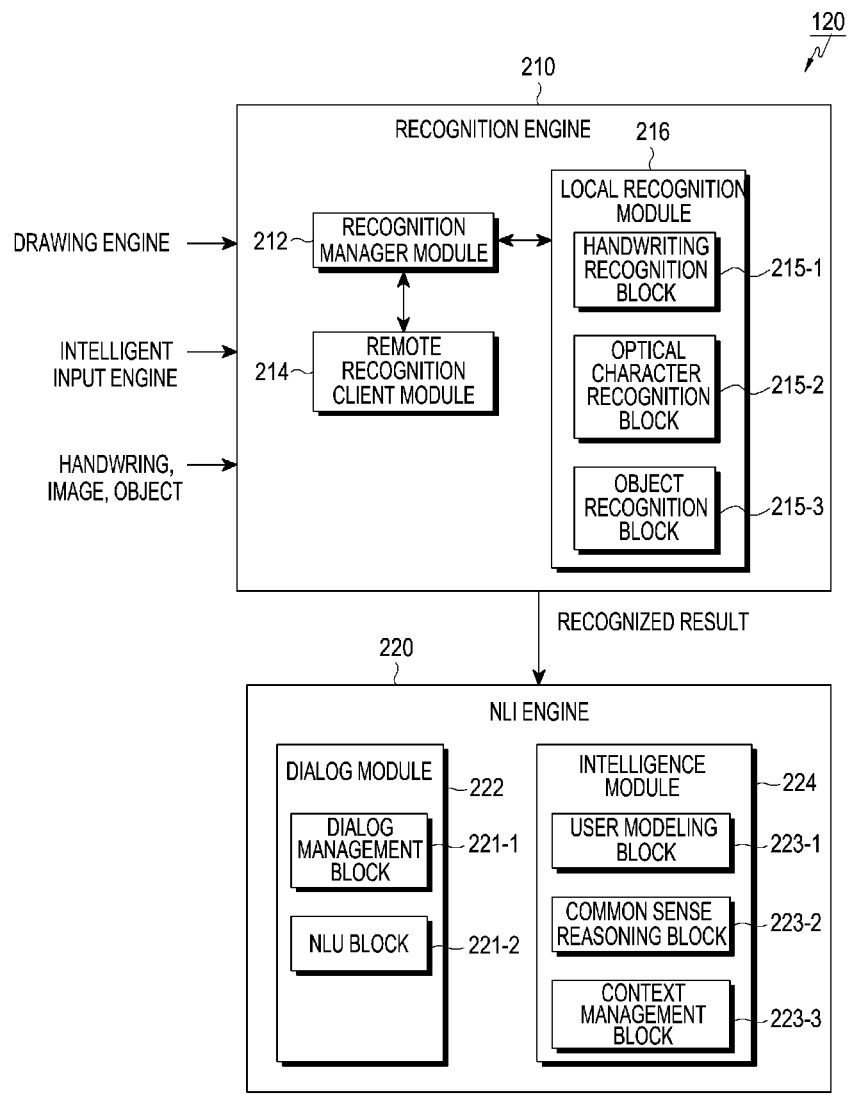
FIG. 2 is a block diagram of a command processor for supporting handwriting-based NLI in a user terminal according to an embodiment of the present disclosure.

FIG. 2 is a block diagram of the command processor 120 for supporting handwriting-based NLI in the user terminal according to an embodiment of the present disclosure.

Referring to FIG. 2, the command processor 120 supporting handwriting-based NLI includes a recognition engine 210 and an NLI engine 220.

The recognition engine 210 includes a recognition manager module 212, a remote recognition client module 214, and a local recognition module 216. The local recognition module 216 includes a handwriting recognition block 215-1, an optical character recognition block 215-2, and an object recognition block 215-3.

The NLI engine 220 includes a dialog module 222 and an intelligence module 224. The dialog module 222 includes a dialog management block 221-1 for controlling a dialog flow and a Natural Language Understanding (NLU) block 221-2 for recognizing a user's intention. The intelligence module 224 includes a user modeling block 223-1 for reflecting user preferences, a common sense reasoning block 223-2 for reflecting common sense, and a context management block 223-3 for reflecting a user situation.

The recognition engine 210 may receive information, a handwriting image, object information, etc. from a drawing engine corresponding to an input means such as an electronic pen and an intelligent input platform such as a camera. The information received at the recognition engine 210 may take the form of text, a line, a symbol, a pattern, or a combination of them.

The recognition engine 210 recognizes note contents included in a user-selected area of a currently displayed note or a user-indicated command from text, a line, a symbol, a pattern, a figure, or a combination of them received as the information. The recognition engine 210 outputs a recognized result obtained in the above operation.

For this purpose, the recognition engine 210 includes the recognition manager module 212 for providing overall control to output a recognized result, the remote recognition client module 214, and the local recognition module 216 for recognizing input information. The local recognition module 216 includes at least the handwriting recognition block 215-1 for recognizing handwritten input information, the optical character recognition block 215-2 for recognizing information from an input optical signal, and the object recognition block 215-3 for recognizing information from an input gesture.

Recognized results output from the handwriting recognition block 215-1, the optical character recognition block 215-2, and the object recognition block 215-3 are provided to the NLI engine 220.

The NLI engine 220 determines the intention of the user by processing the recognized results received from the recognition engine 210. That is, the NLI engine 220 determines user-intended input information from the recognized results received from the recognition engine 210. Specifically, the NLI engine 220 collects sufficient information by exchanging questions and answers with the user based on handwriting-based NLI and determines the intention of the user based on the collected information.

For this operation, the dialog module 222 of the NLI engine 220 creates a question to make a dialog with the user and provides the question to the user, thereby controlling a dialog flow to receive an answer from the user. The dialog module 222 manages information acquired from questions and answers (the dialog management block 221-1). The dialog module 222 also understands the intention of the user by performing a natural language process on an initially received command, taking into account the managed information (the NLU block 221-2).

The intelligence module 224 of the NLI engine 220 generates information to be referred to for understanding the intention of the user through the natural language process and provides the reference information to the dialog module 222. For example, the intelligence module 224 models information reflecting a user preference by analyzing a user's habit in making a note (the user modeling block 223-1), induces information for reflecting common sense (the common sense reasoning block 223-2), or manages information representing a current user context (the context management block 223-3).

Therefore, the dialog module 222 of the NLI engine 220 may control a dialog flow in a question and answer procedure with the user with the help of information received from the intelligence module 224.

Figure 3:
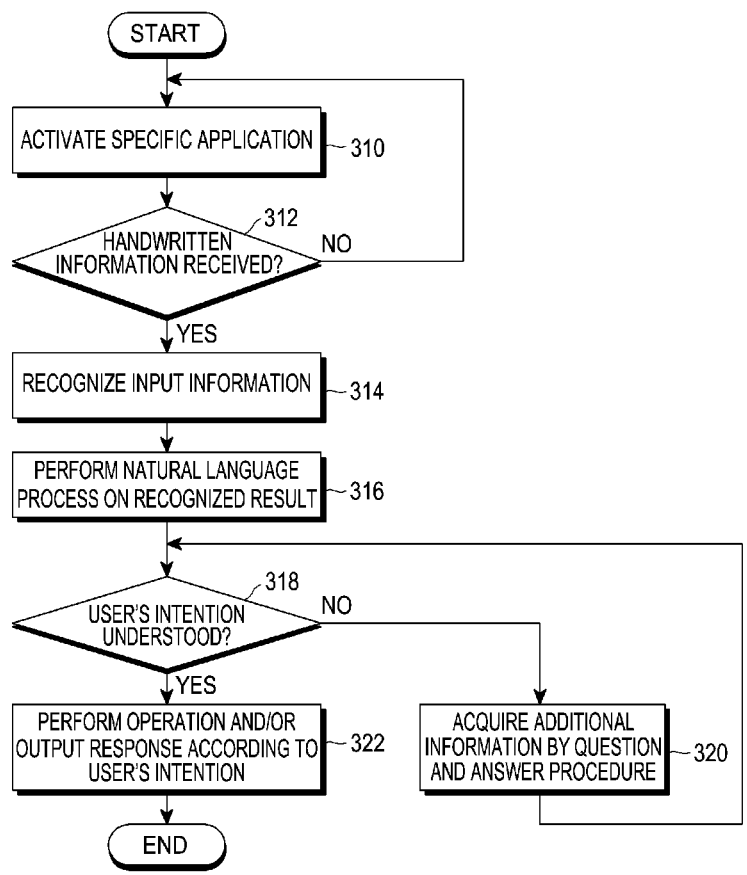
FIG. 3 is a flowchart illustrating a control operation for supporting a User Interface (UI) using handwriting-based NLI in a user terminal according to an embodiment of the present disclosure.

FIG. 3 is a flowchart illustrating a control operation for supporting a UI using handwriting-based NLI in the user terminal according to an embodiment of the present disclosure.

Referring to FIG. 3, the user terminal activates a specific application and provides a function of the activated application at operation 310. The specific application is an application of which the activation has been requested by the user from among applications installed in the user terminal.

For example, the user may activate the specific application by the memo function of the user terminal. That is, the user terminal launches a memo layer on a screen, upon a user request. Then, upon receipt of identification information of the specific application and information corresponding to an execution command, the user terminal searches for the specific application and activates the detected application.

This method is useful for fast execution of an intended application from among a large number of applications installed in the user terminal.

The identification information of the specific application may be the name of the application, for example. The information corresponding to the execution command may be a figure, symbol, pattern, text, etc. preset to command activation of the application.

Figure 4:
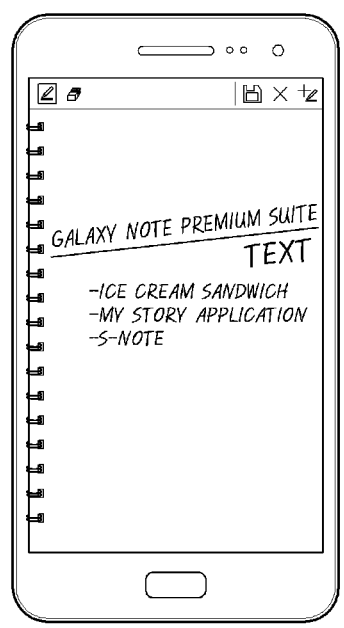
FIG. 4 illustrates an example of requesting an operation based on a specific application or function by a memo function according to an embodiment of the present disclosure.

FIG. 4 illustrates an example of requesting an operation based on a specific application or function by the memo function according to an embodiment of the present disclosure.

Referring to FIG. 4, a part of a note written by the memo function is selected using a line, a closed loop, or a figure and the selected note contents are processed using another application. For example, note contents "galaxy note premium suite' is selected using a line and a command is issued to send the selected note contents using a text sending application.

If there is no application matching the user input in the user terminal, a candidate set of similar applications may be provided to the user so that the user may select an intended application from among the candidate applications.

In another example, a function supported by the user terminal may be executed by the memo function. For this purpose, the user terminal invokes a memo layer upon a user request and searches for an installed application according to user-input information.

For instance, a search keyword is input to a memo screen displayed for the memo function in order to search for a specific application among applications installed in the user terminal. Then the user terminal searches for the application matching the input keyword. That is, if the user writes 'car game' on the screen by the memo function, the user terminal searches for applications related to 'car game' among the installed applications and provides the search results on the screen.

In another example, the user may input an installation month, for example, February 2011 on the screen by the memo function. Then the user terminal searches for applications installed in February 2011. That is, when the user writes 'February 2011' on the screen by the memo function, the user terminal searches for applications installed in 'February 2011' among the installed applications and provides the search results on the screen.

As described above, in the case where a large number of applications are installed in the user terminal, activation of or search for a specific application based on a user's note is useful.

For more efficient search for applications, the installed applications are preferably indexed. The indexed applications may be classified by categories such as feature, field, function, etc.

Upon receipt of a specific key input or a specific gesture input from the user, the memo layer may be invoked to allow the user to input identification information of an application to be activated or to input index information to search for a specific application.

Specific applications activated or searched for in the above-described manner include a memo application, a scheduler application, a map application, a music application, and a subway application.

Upon activation of the specific application, the user terminal monitors input of handwritten information at operation 312. The input information may take the form of text, a line, symbol, pattern, or a combination of them. In addition, the user terminal may monitor input of information that selects a whole or part of the note written on the current screen.

If the note is partially or wholly selected, the user terminal continuously monitors additional input of information corresponding to a command in order to process the selected note contents at operation 312.

If no input of handwritten information is sensed, the process returns to operation 310. However, upon sensing input of handwritten information, the user terminal performs an operation for recognizing the sensed input information at operation 314. For example, text information for the selected whole or partial note contents is recognized or input information taking the form of a line, symbol, pattern, or a combination of them in addition to text is recognized. The recognition engine 210 illustrated in FIG. 2 is responsible for recognizing the input information.

Once the user terminal recognizes the sensed input information, the user terminal performs a natural language process on the recognized text information to understand the contents of the recognized text information in operation 316. The NLI engine 220 is responsible for the natural language process of the recognized text information.

If determining that the input information is a combination of text and a symbol, the user terminal also processes the symbol along with the natural language process.

In the symbol process, the user terminal analyzes an actual memo pattern of the user and detects a main symbol that the user frequently uses by the analysis of the memo pattern. Then the user terminal analyzes the intention of using the detected main symbol and determines the meaning of the main symbol based on the analysis result.

The meaning that the user intends for each main symbol is built into a database, for later use in interpreting a later input symbol. That is, the prepared database may be used for symbol processing.

Figure 5:
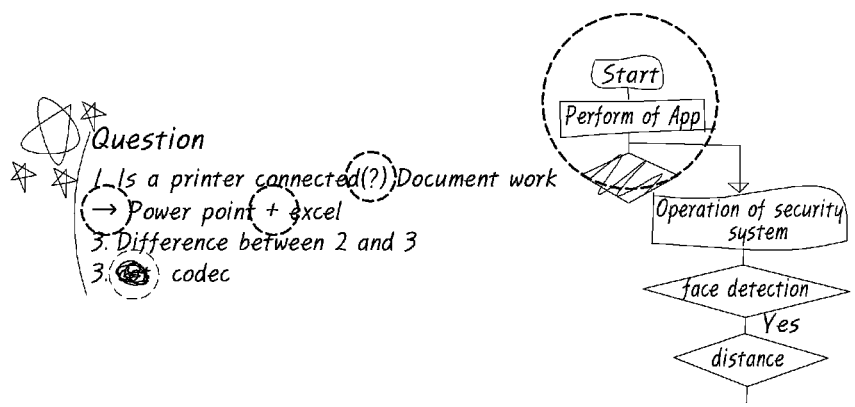
FIG. 5 illustrates an example of a user's actual memo pattern for use in implementing embodiments according to an embodiment of the present disclosure.

FIG. 5 illustrates an actual memo pattern of a user for use in implementing embodiments according to an embodiment of the present disclosure. The memo pattern illustrated in FIG. 5 demonstrates that the user frequently uses symbols →, ( ), _, -, +, and ?. For example, symbol → is used for additional description or paragraph separation and symbol ( ) indicates that the contents within ( ) is a definition of a term or a description.

The same symbol may be interpreted as different meanings. For example, symbol → may signify 'time passage', 'causal relationship', 'position', 'description of relationship between attributes', 'reference point for clustering', 'change', etc.

Figure 6:
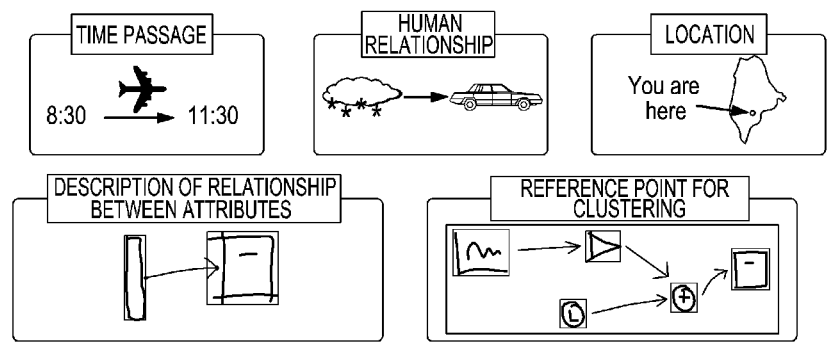
FIG. 6 illustrates an example in which one symbol may be interpreted as various meanings according to an embodiment of the present disclosure.

FIG. 6 illustrates an example in which one symbol may be interpreted as various meanings according to an embodiment of the present disclosure.

Referring to FIG. 6, symbol → may be used in the meanings of time passage, causal relationship, position, etc.

Figure 7:
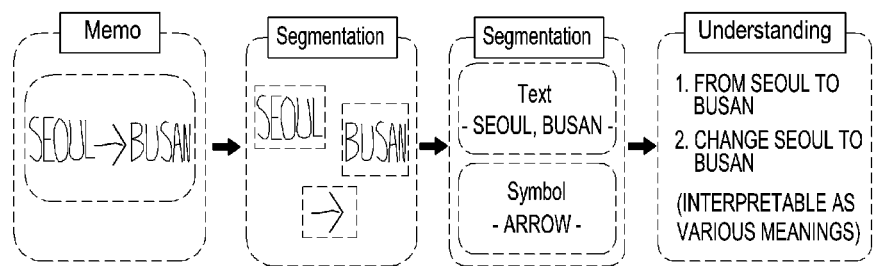
FIG. 7 illustrates an example in which input information including text and a symbol in combination may be interpreted as different meanings depending on the symbol according to an embodiment of the present disclosure.

FIG. 7 illustrates an example in which input information including a combination of text and a symbol may be interpreted as different meanings depending on the symbol according to an embodiment of the present disclosure.

Referring to FIG. 7, user-input information 'Seoul→Busan' may be interpreted to imply that 'change Seoul to 'Busan' as well as 'from Seoul to Busan'.

A symbol that allows a plurality of meanings may be interpreted, taking into account additional information or the relationship with previous or following information. However, this interpretation may lead to inaccurate assessment of the user's intention.

To address the problem, extensive research and efforts on symbol recognition/understanding are performed. For example, the relationship between symbol recognition and understanding is under research in semiotics of the liberal arts field and the research is utilized in advertisements, literature, movies, traffic signals, etc. Semiotics is, in its broad sense, the theory and study of functions, analysis, interpretation, meanings, and representations of signs and symbols, and various systems related to communication.

Signs and symbols are also studied from the perspective of engineering science. For example, research is conducted on symbol recognition of a flowchart and a blueprint in the field of mechanical/electrical/computer engineering. The research is used in sketch (hand-drawn diagram) recognition. Further, recognition of complicated chemical structure formulas is studied in chemistry and this study is used in hand-drawn chemical diagram recognition.

Figure 8:
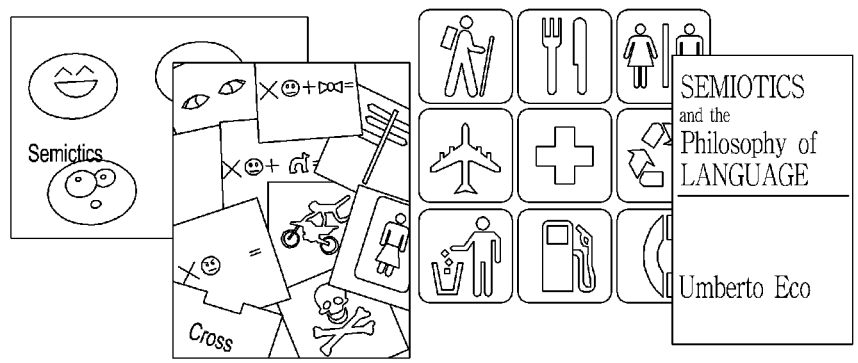
FIG. 8 illustrates examples of utilizing signs and symbols in semiotics according to an embodiment of the present disclosure.

FIG. 8 illustrates uses of signs and symbols in semiotics according to an embodiment of the present disclosure.

Figure 9:
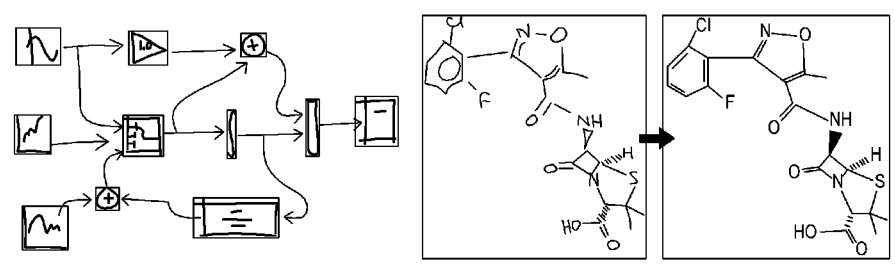
FIG. 9 illustrates examples of utilizing signs and symbols in mechanical/electrical/computer engineering and chemistry according to an embodiment of the present disclosure.

FIG. 9 illustrates uses of signs and symbols in the fields of mechanical/electrical/computer engineering and chemistry according to an embodiment of the present disclosure.

The user terminal understands the contents of the user-input information by the natural language process of the recognized result and then assesses the intention of the user regarding the input information based on the recognized contents at operation 318.

Once the user terminal determines the user's intention regarding the input information, the user terminal performs an operation corresponding to the user's intention or outputs a response corresponding to the user's intention at operation 322. After performing the operation corresponding to the user's intention, the user terminal may output the result of the operation to the user.

On the contrary, if the user terminal fails to assess the user's intention regarding the input information, the user terminal acquires additional information by a question and answer procedure with the user to determine the user's intention at operation 320. For this purpose, the user terminal creates a question to ask the user and provides the question to the user. When the user inputs additional information by answering the question, the user terminal re-assesses the user's intention, taking into account the new input information in addition to the contents understood previously by the natural language process at operation 318.

While not shown, the user terminal may additionally perform operations 314 and 316 to understand the new input information.

Until assessing the user's intention accurately, the user terminal may acquire most of information required to determine the user's intention by exchanging questions and answers with the user, that is, by making a dialog with the user at operation 320.

Once the user terminal determines the user's intention in the afore-described question and answer procedure, the user terminal outputs the result of an operation corresponding to the user's intention or outputs a response result corresponding to the user's intention to the user at operation 322.

The configuration of the UI apparatus in the user terminal and the UI method using handwriting-based NLI in the UI apparatus may be considered in various scenarios.

FIGS. 10, 11A, 11B, 12A, 12B, 13A, 13B, 14A, 14B, 14C, 15, 16A, 16B and 17 illustrate operation scenarios based on applications supporting the memo function according to an embodiment of the present disclosure.

FIGS. 10, 11A, 11B, 12A, 12B, 13A, 13B, 14A, 14B, 14C, 15, 16A, 16B and 17 illustrate examples of processing a note that a user has input in an application supporting the memo function, by invoking another application.

Figure 10:
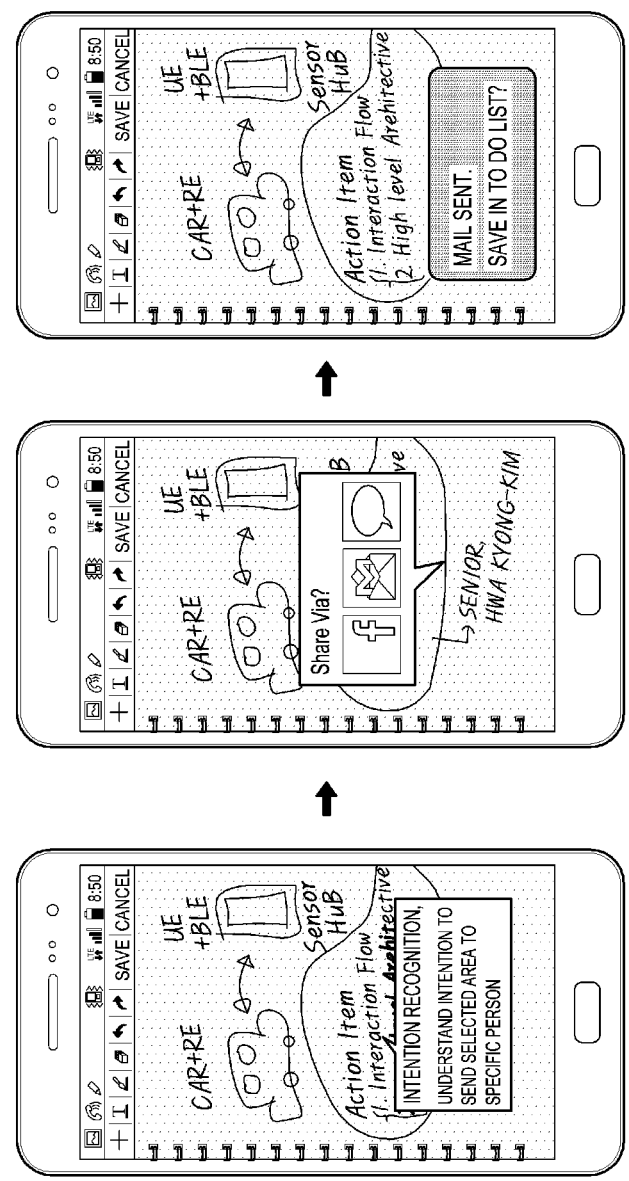
FIGS. 10, 11A, 11B, 12A, 12B, 13A, 13B, 14A, 14B, 14C, 15, 16A, 16B and 17 illustrate operation scenarios of a UI technology according to an embodiment of the present disclosure.

FIG. 10 illustrates a scenario of sending a part of a note by mail using the memo function in the user terminal.

Referring to FIG. 10, the user writes a note on a screen of the user terminal by the memo function and selects a part of the note by means of a line, symbol, closed loop, etc. For example, a partial area of the whole note may be selected by drawing a closed loop, thereby selecting the contents of the note within the closed loop.

Then the user inputs a command requesting processing the selected contents using a preset or intuitively recognizable symbol and text. For example, the user draws an arrow indicating the selected area and writes text indicating a person (e.g., Senior, Hwa Kyong-KIM).

Upon receipt of the information, the user terminal interprets the user's intention as meaning that the note contents of the selected area are to be sent to 'Senior, Hwa Kyong-KIM'. Then the user terminal extracts recommended applications capable of sending the selected note contents from among installed applications and displays the extracted recommended applications on the screen so that the user may request selection or activation of a recommended application.

When the user selects one of the recommended applications, the user terminal invokes the selected application and sends the selected note contents to 'Senior, Hwa Kyong-KIM' by the application.

If information about the recipient is not pre-registered, the user terminal may ask the user a mail address of 'Senior, Hwa Kyong-KIM'. In this case, the user terminal may send the selected note contents in response to reception of the mail address from the user.

After processing as intended by the user, the user terminal displays the processed result on the screen so that the user may confirm appropriate processing conforming to the user's intention. For example, the user terminal asks the user whether to store details of the sent mail in a list, while displaying a message indicating completion of the mail transmission. When the user requests storing of the details of the sent mail in the list, the user terminal registers the details of the sent mail in the list.

The above scenario can help to increase throughput by allowing the user terminal to send contents of a note taken during a conference to the other party without the need for shifting from one application to another and store details of the sent mail through interaction with the user.

Figure 11A:
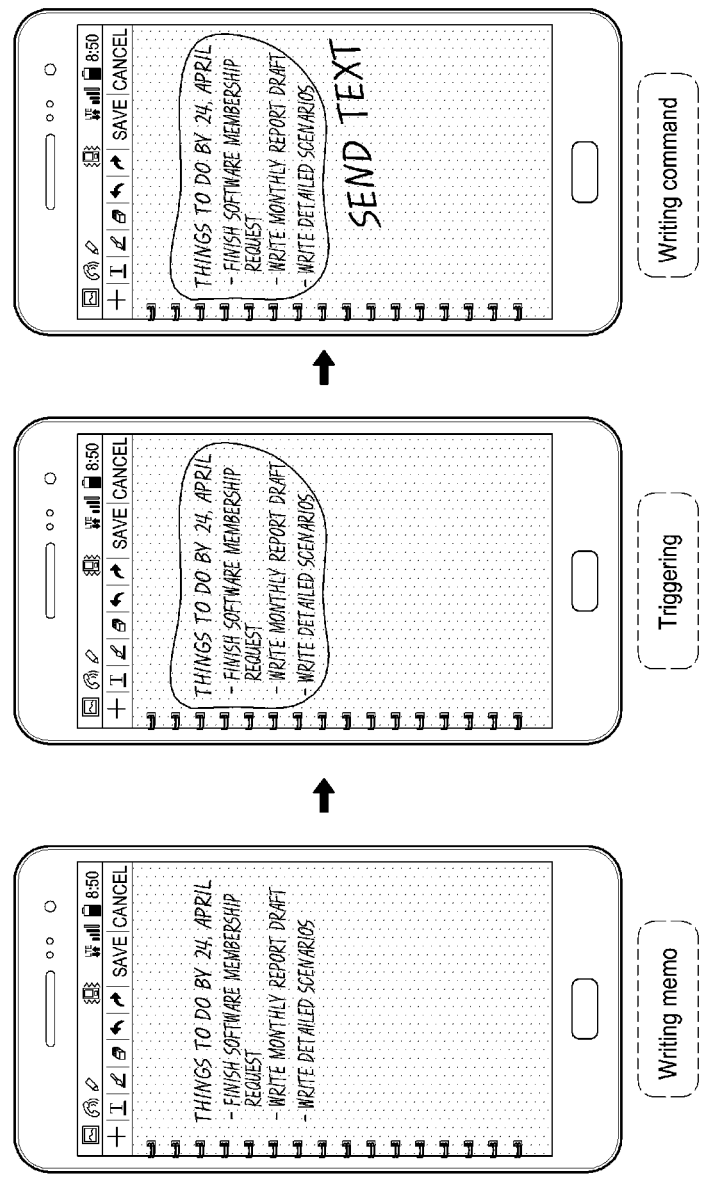
Figure 11B:
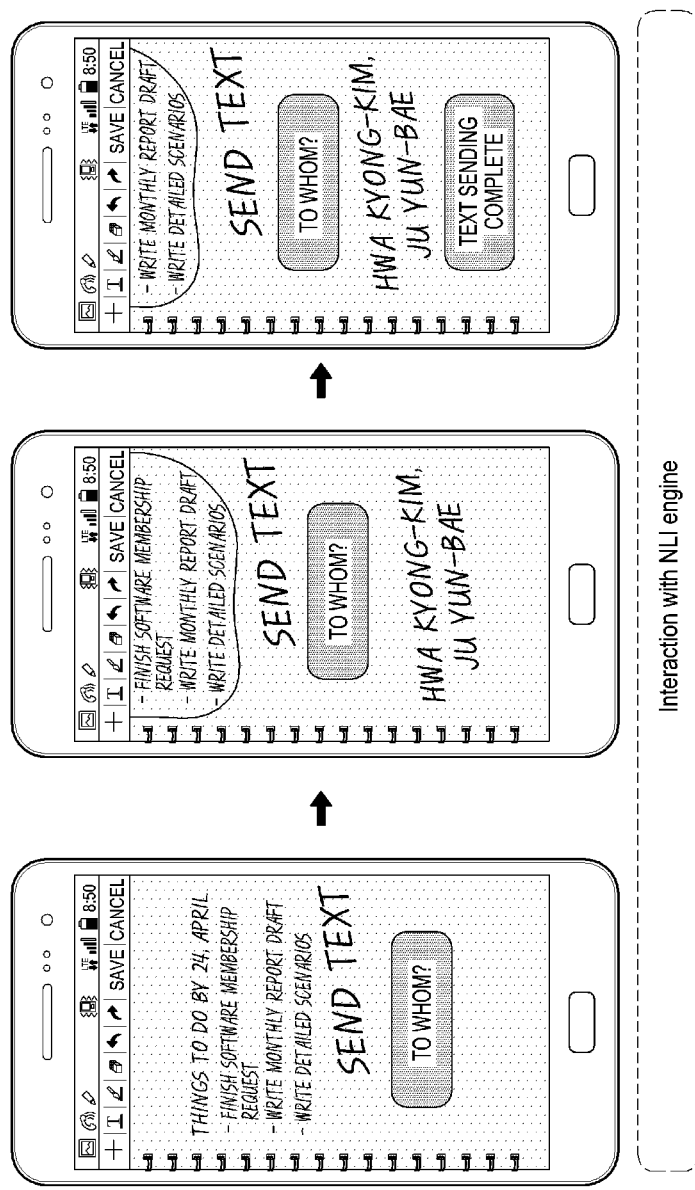

FIGS. 11A and 11B illustrate a scenario of sending a whole note by the memo function in the user terminal according to an embodiment of the present disclosure.

Referring to FIGS. 11A and 11B, the user writes a note on a screen by the memo function (e.g., writing memo). Then the user selects the whole note using a line, symbol, closed loop, etc. (e.g., triggering). For example, when the user draws a closed loop around the full note, the user terminal may recognize that the whole contents of the note within the closed loop are selected.

The user requests text-sending of the selected contents by writing preset or intuitively recognizable text, for example, 'send text' (e.g., writing command).

The NLI engine that configures a UI based on user-input information recognizes that the user intends to send the contents of the selected area in text. Then the NLI engine further acquires information by exchanging a question and an answer with the user, determining that information is insufficient for text sending. For example, the NLI engine asks the user to whom to send the text, for example, by displaying 'To whom?' on the screen.

The user inputs information about a recipient to receive the text by the memo function as an answer to the question. The name or phone number of the recipient may be directly input as the information about the recipient. Referring to FIGS. 11A and 11B, 'Hwa Kyong-KIM' and 'Ju Yun-BAE" are input as recipient information.

The NLI engine detects phone numbers mapped to the input names 'Hwa Kyong-KIM' and 'Ju Yun-BAE" in a directory and sends a text having the selected note contents as a text body to the phone numbers. If the selected note contents are an image, the user terminal may additionally convert the image to text so that the other party may recognize it.

Upon completion of the text transmission, the NLI engine displays a notification indicating the processed result, for example, a message 'text has been sent'. Therefore, the user can confirm that the process has been appropriately completed as intended.

Figure 12A:
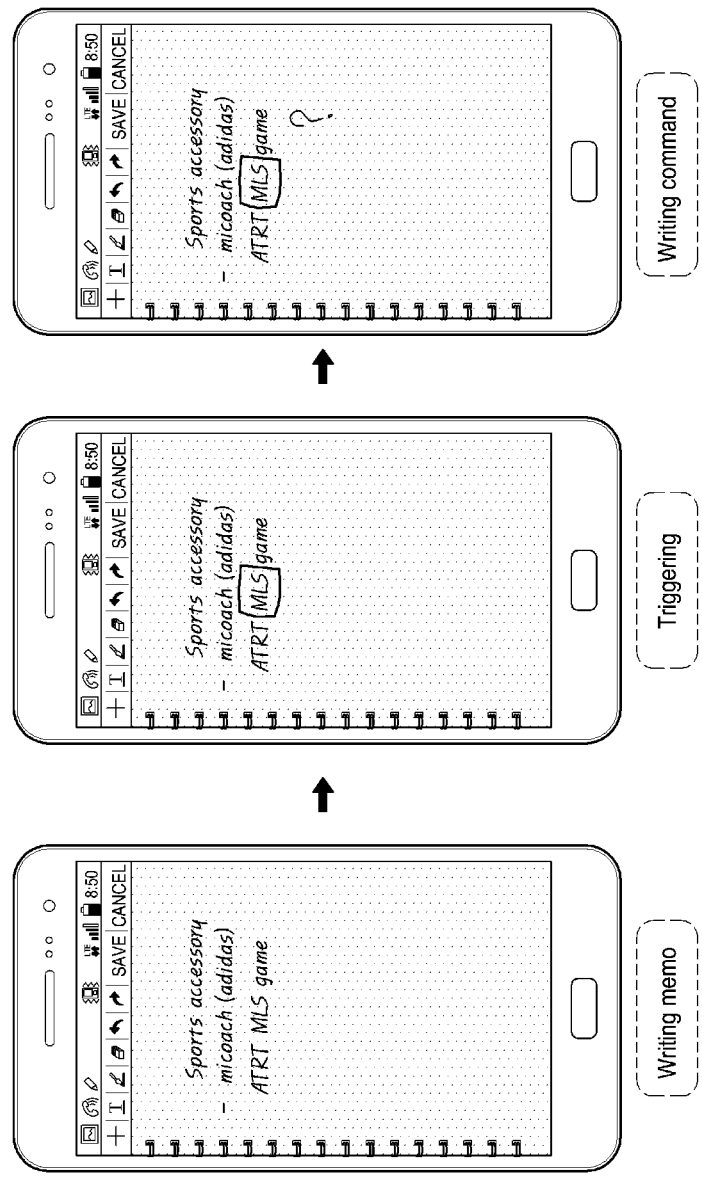
Figure 12B:
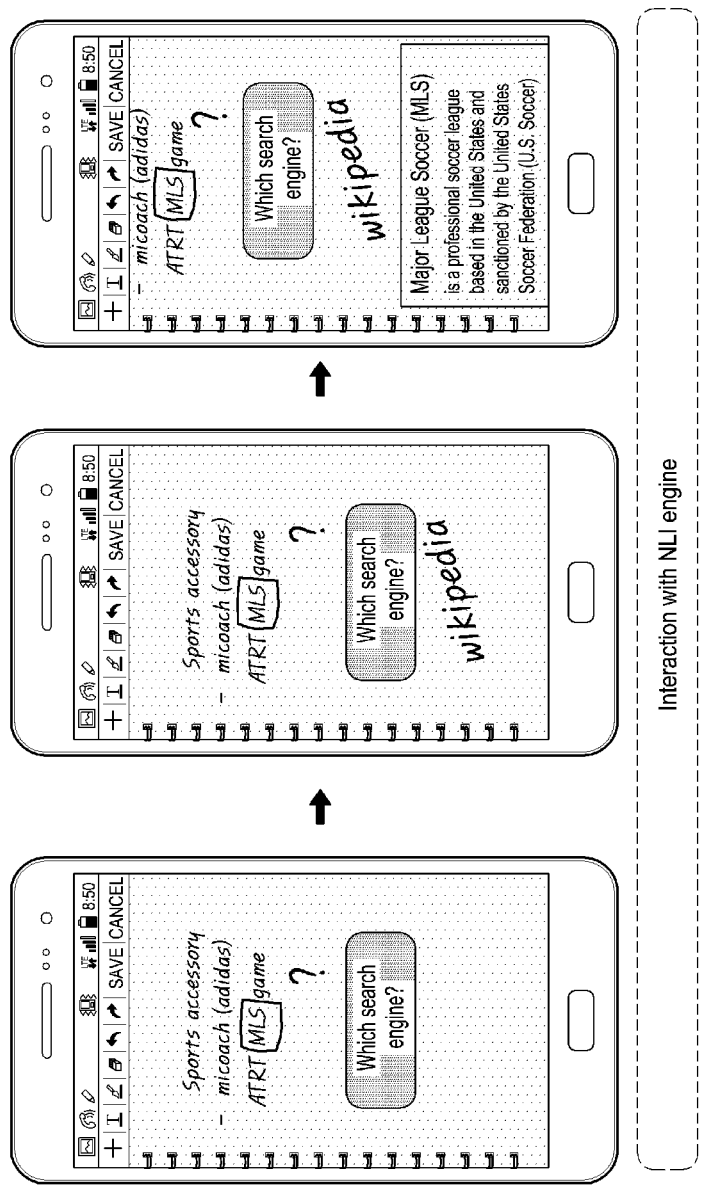

FIGS. 12A and 12B illustrate a scenario of finding the meaning of a part of a note by the memo function in the user terminal according to an embodiment of the present disclosure.

Referring to FIGS. 12A and 12B, the user writes a note on a screen by the memo function (e.g., writing memo). Then the user selects a part of the note using a line, symbol, closed loop, etc. (e.g., triggering). For example, the user may select one word written in a partial area of the note by drawing a closed loop around the word.

The user asks the meaning of the selected word by writing a preset or intuitively recognizable symbol, for example, '?' (e.g., writing command).

The NLI engine that configures a UI based on user-input information asks the user which engine to use in order to find the meaning of the selected word. For this purpose, the NLI engine uses a question and answer procedure with the user. For example, the NLI engine prompts the user to input information for selecting a search engine by displaying 'Which search engine?' on the screen.

The user inputs 'wikipedia' as answer by the memo function. Thus, the NLI engine recognizes that the user intends to use 'wikipedia' as a search engine using the user input as a keyword. The NLI engine finds the meaning of the selected word 'MLS' using 'wikipedia' and displays search results. Therefore, the user is aware of the meaning of the 'MLS' from the information displayed on the screen.

Figure 13A:
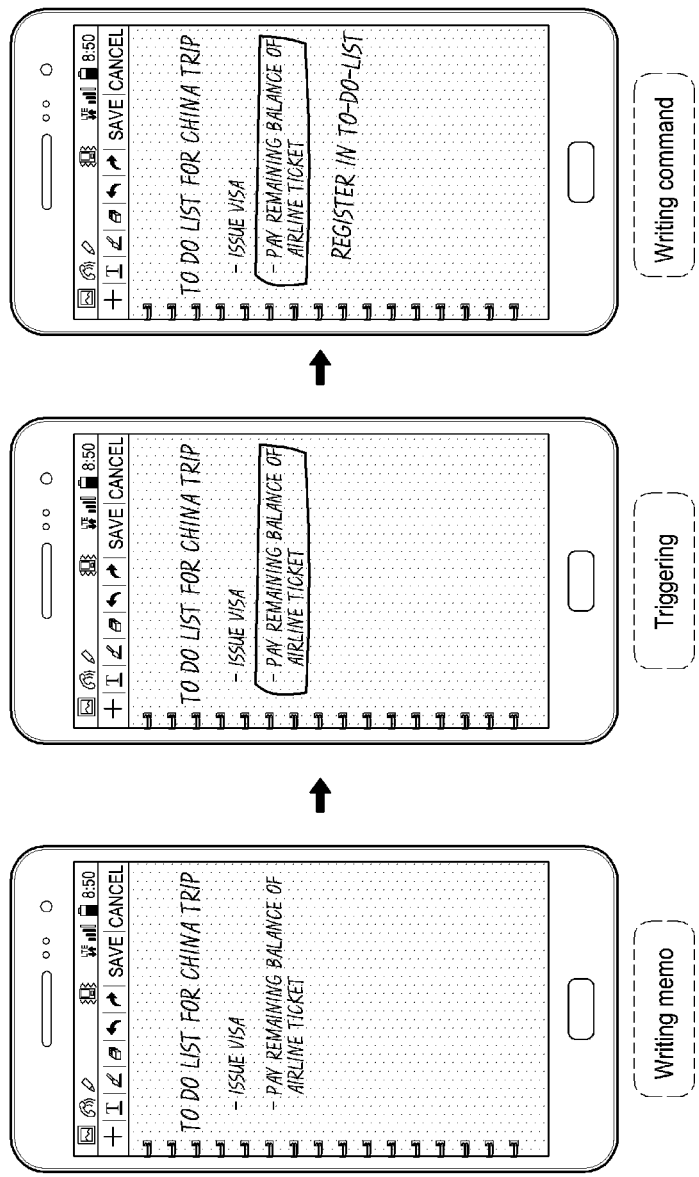
Figure 13B:
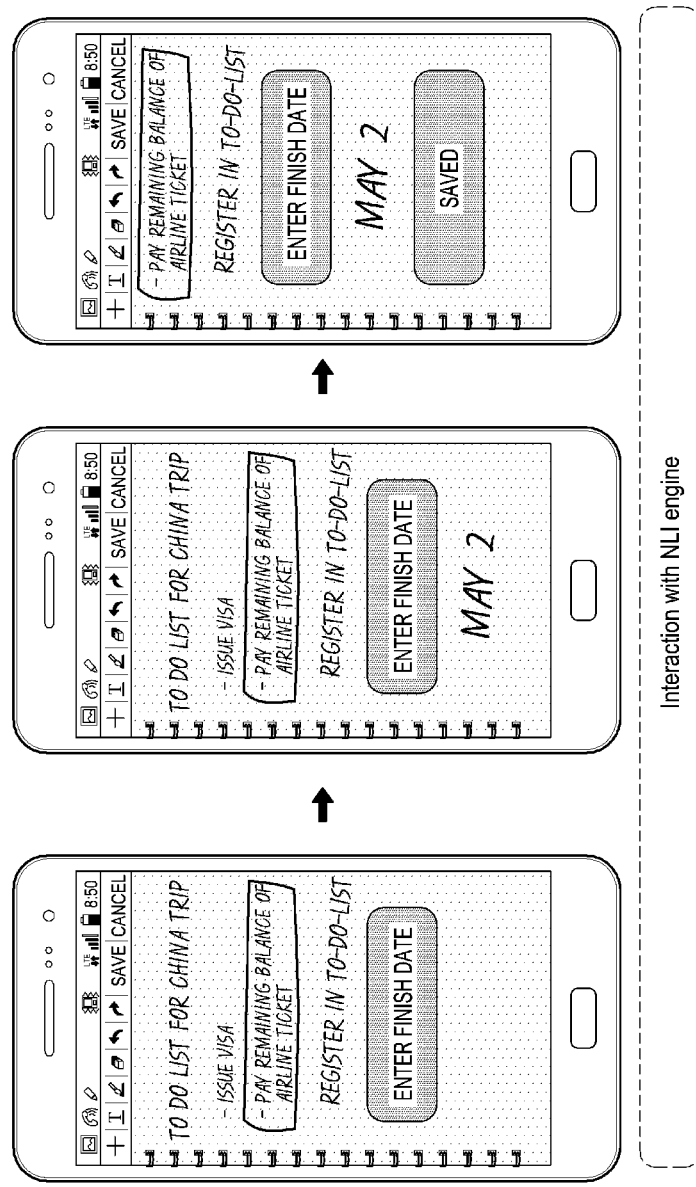

FIGS. 13A and 13B illustrate a scenario of registering a part of a note written by the memo function as information for another application in the user terminal according to an embodiment of the present disclosure.

Referring to FIGS. 13A and 13B, the user writes a to-do-list of things to prepare for a China trip on a screen of the user terminal by the memo function (e.g., writing memo). Then the user selects a part of the note using a line, symbol, closed loop, etc. (e.g., triggering). For example, the user selects 'pay remaining balance of airline ticket' in a part of the note by drawing a closed loop around the text.

The user requests registration of the selected note contents in a to-do-list by writing preset or intuitively recognizable text, for example, 'register in to-do-list' (e.g., writing command).

The NLI engine that configures a UI based on user-input information recognizes that the user intends to request scheduling of a task corresponding to the selected contents of the note. Then the NLI engine further acquires information by a question and answer procedure with the user, determining that information is insufficient for scheduling. For example, the NLI engine prompts the user to input information by asking a schedule, for example, by displaying 'Enter finish date' on the screen.

The user inputs 'May 2' as a date by which the task should be finished by the memo function as an answer. Thus, the NLI engine stores the selected contents as a thing to do by May 2.

After processing the user's request, the NLI engine displays the processed result, for example, a message 'saved'. Therefore, the user is aware that an appropriate process has been performed as intended.

Figure 14A:
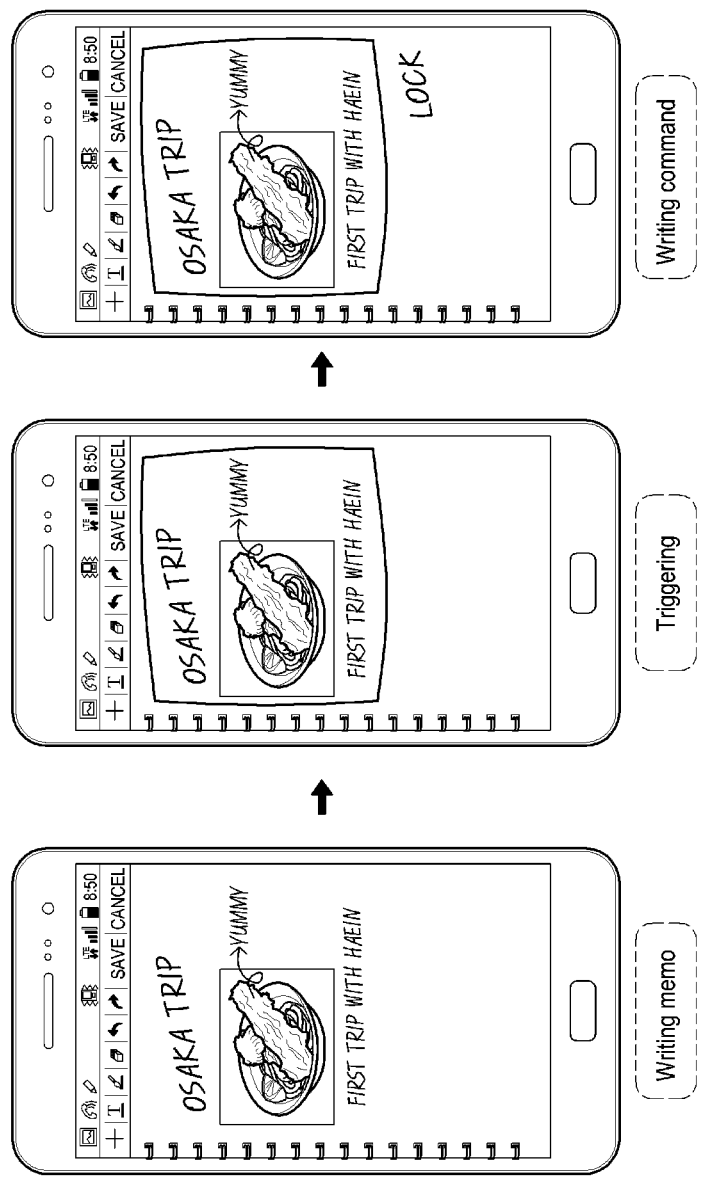
Figure 14B:
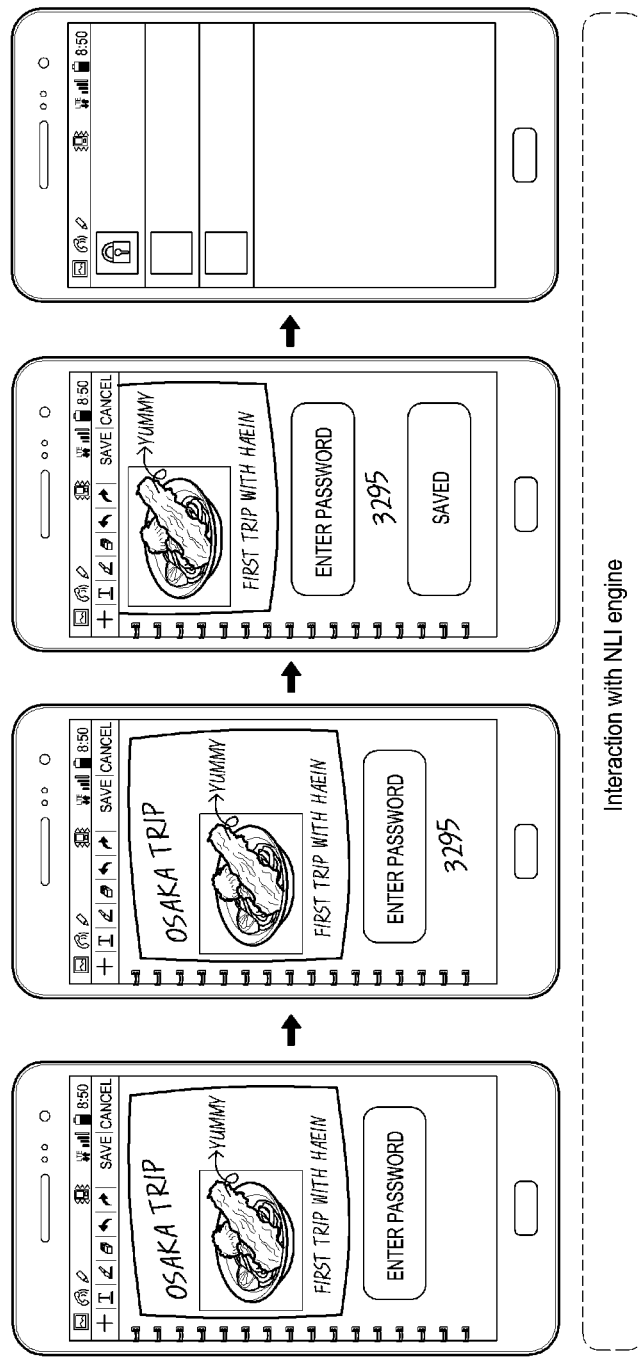

FIGS. 14A and 14B illustrate a scenario of storing a note written by the memo function using a lock function in the user terminal according to an embodiment of the present disclosure. FIG. 14B illustrates a scenario of reading the note that has been stored by the lock function according to an embodiment of the present disclosure.

Referring to FIG. 14A, the user writes the user's experiences during an Osaka trip using a photo and a note on a screen of the user terminal by the memo function (e.g., writing memo). Then the user selects a whole or part of the note using a line, symbol, closed loop, etc. (e.g., triggering). For example, the user selects the whole note by drawing a closed loop around the note.

The user requests registration of the selected note contents by the lock function by writing preset or intuitively recognizable text, for example, 'lock' (e.g., writing command).

The NLI engine that configures a UI based on user-input information recognizes that the user intends to store the contents of the note by the lock function. Then the NLI engine further acquires information by a question and answer procedure with the user, determining that additional information is needed for setting the lock function. For example, referring to FIG. 14B, the NLI displays a question asking a password, for example, a message 'Enter password' on the screen to set the lock function.

The user inputs '3295' as the password by the memo function as an answer in order to set the lock function. Thus, the NLI engine stores the selected note contents using the password '3295'.

After storing the note contents by the lock function, the NLI engine displays a notification indicating the processed result, for example, a message 'saved'. Therefore, the user is aware that an appropriate process has been performed as intended.

Figure 14C:
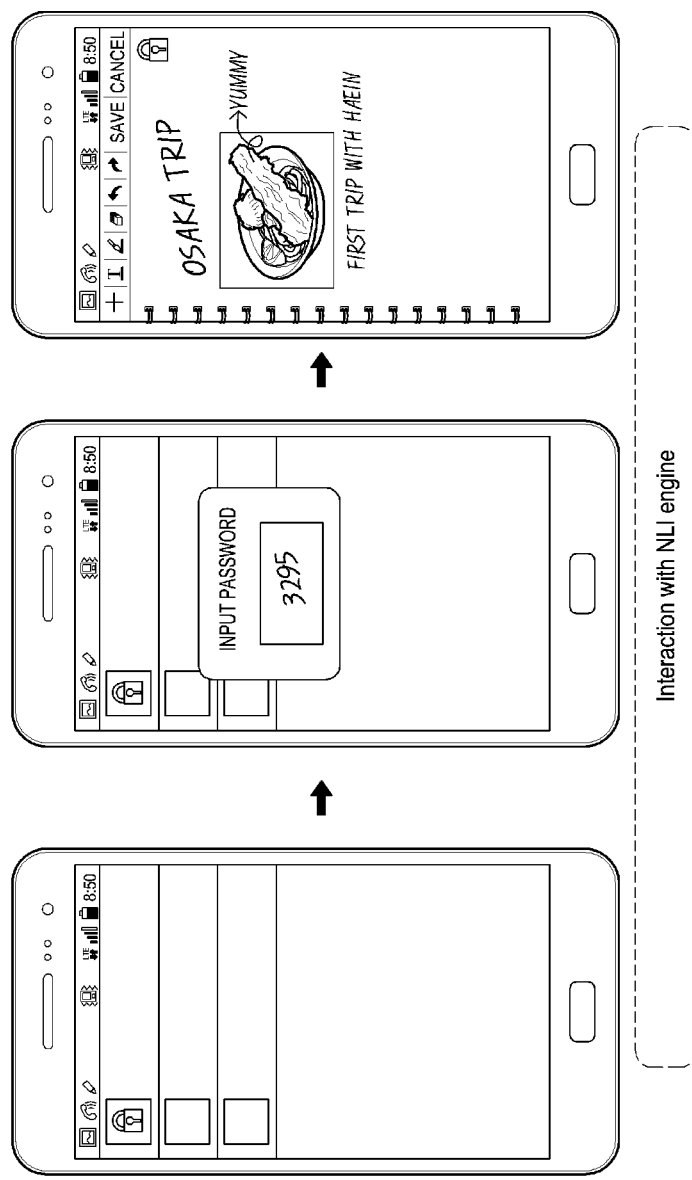

Referring to FIG. 14C, the user selects a note from among notes stored by the lock function (e.g., selecting memo). Upon selection of a specific note by the user, the NLI engine prompts the user to enter the password by a question and answer procedure, determining that the password is needed to provide the selected note (e.g., writing password). For example, the NLI engine displays a memo window in which the user may enter the password.

When the user enters the valid password, the NLI engine displays the selected note on a screen.

Figure 15:
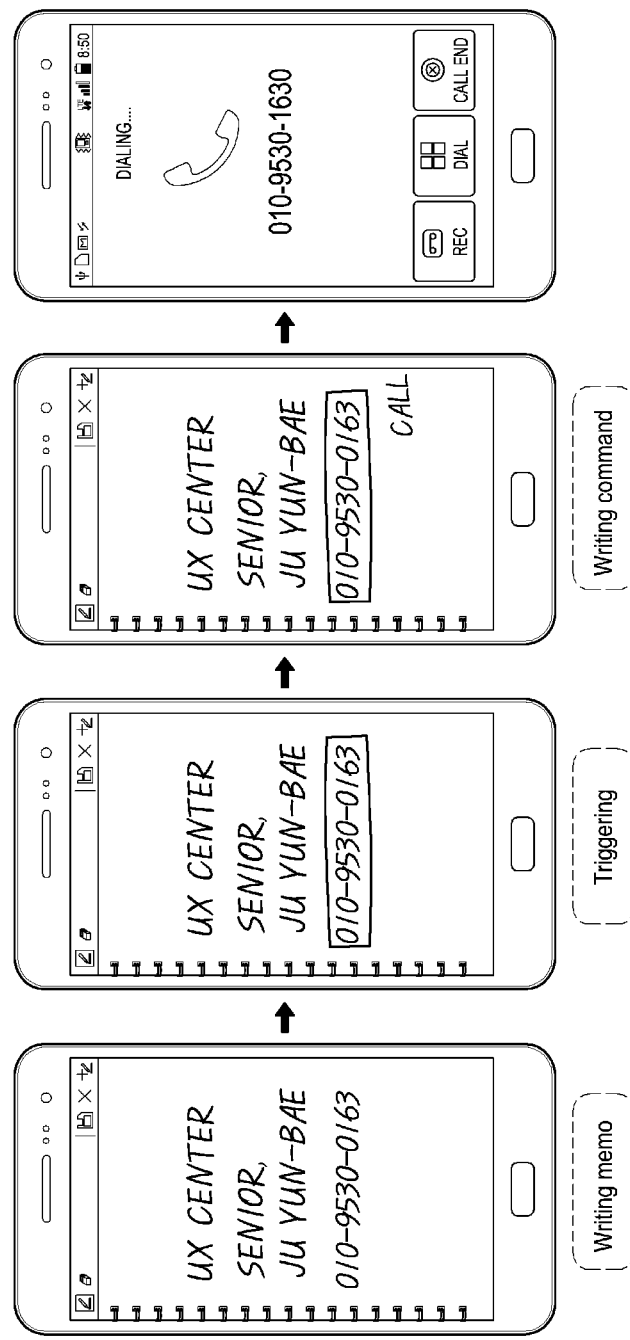

FIG. 15 illustrates a scenario of executing a specific function using a part of a note written by the memo function in the user terminal according to an embodiment of the present disclosure.

Referring to FIG. 15, the user writes a note on a screen of the user terminal by the memo function (e.g., writing memo). Then the user selects a part of the note using a line, symbol, closed loop, etc. (e.g., triggering). For example, the user may select a phone number '010-9530-0163' in the full note by drawing a closed loop around the phone number.

The user requests dialing of the phone number by writing preset or intuitively recognizable text, for example, 'call' (e.g., writing command).

The NLI engine that configures a UI based on user-input information recognizes the selected phone number by translating it into a natural language and attempts to dial the phone number '010-9530-0163'.

Figure 16A:
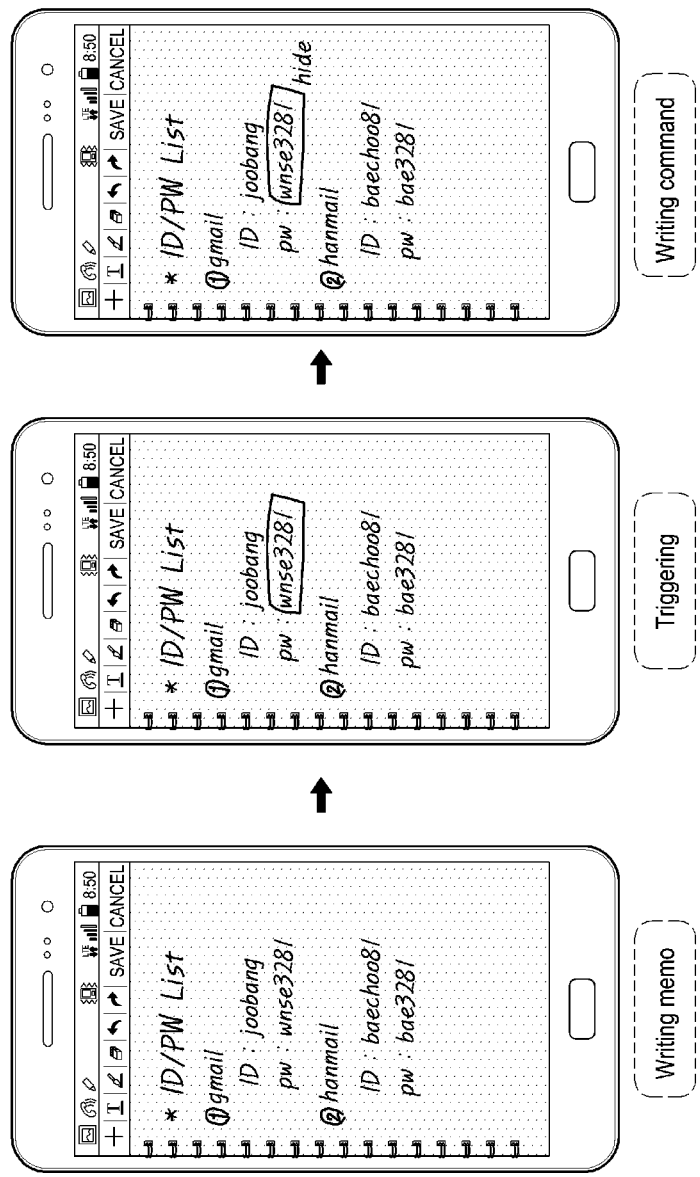
Figure 16B:
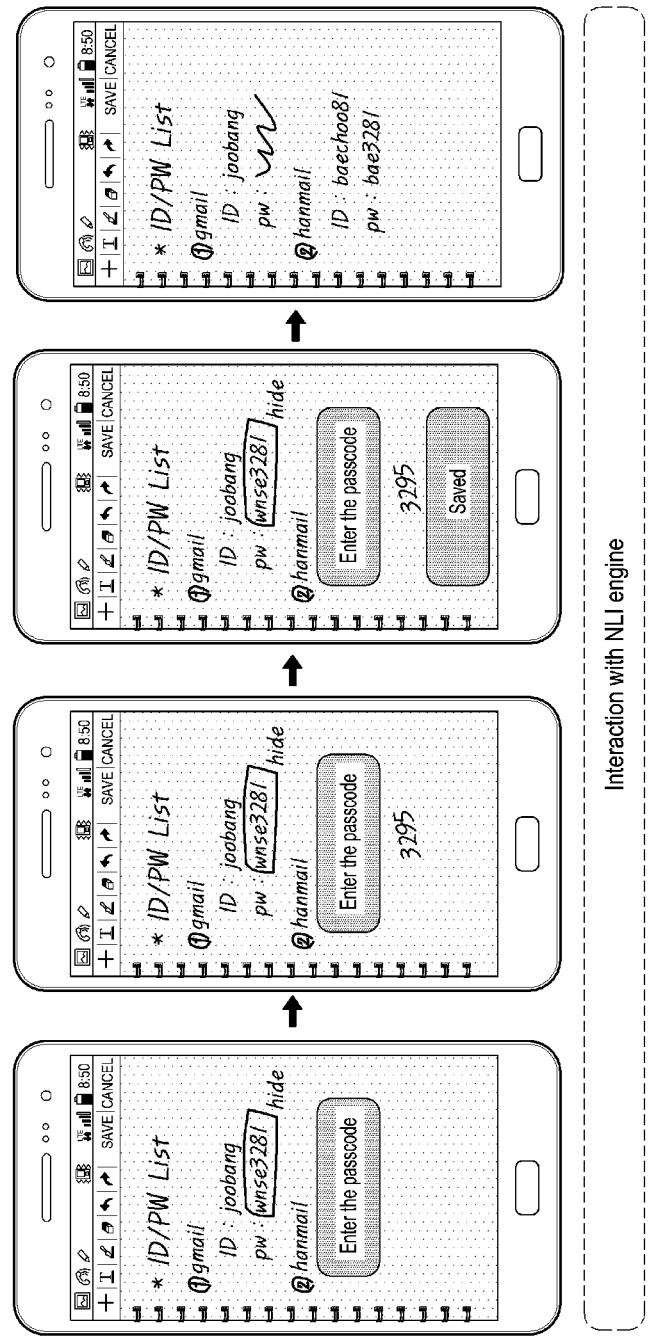

FIGS. 16A and 16B illustrate a scenario of hiding a part of a note written by the memo function in the user terminal according to an embodiment of the present disclosure.

Referring to FIGS. 16A and 16B, the user writes an IDentifier (ID) and a password for each Web site that the user visits on a screen of the user terminal by the memo function (e.g., writing memo). Then the user selects a whole or part of the note using a line, symbol, closed loop, etc. (e.g., triggering). For example, the user selects a password 'wnse3281' in a part of the note by drawing a closed loop around the password.

The user requests hiding of the selected contents by writing preset or intuitively recognizable text, for example, 'hide' (e.g., writing command).

The NLI engine that configures a UI based on user-input information recognizes that the user intends to hide the selected note contents. To use a hiding function, the NLI engine further acquires information from the user by a question and answer procedure, determining that additional information is needed. The NLI engine outputs a question asking the password, for example, a message 'Enter the password' to set the hiding function.

When the user writes '3295' as the password by the memo function as an answer to set the hiding function, the NLI engine recognizes '3295' by translating it into a natural language and stores '3295'. Then the NLI engine hides the selected note contents so that the password does not appear on the screen.

Figure 17:
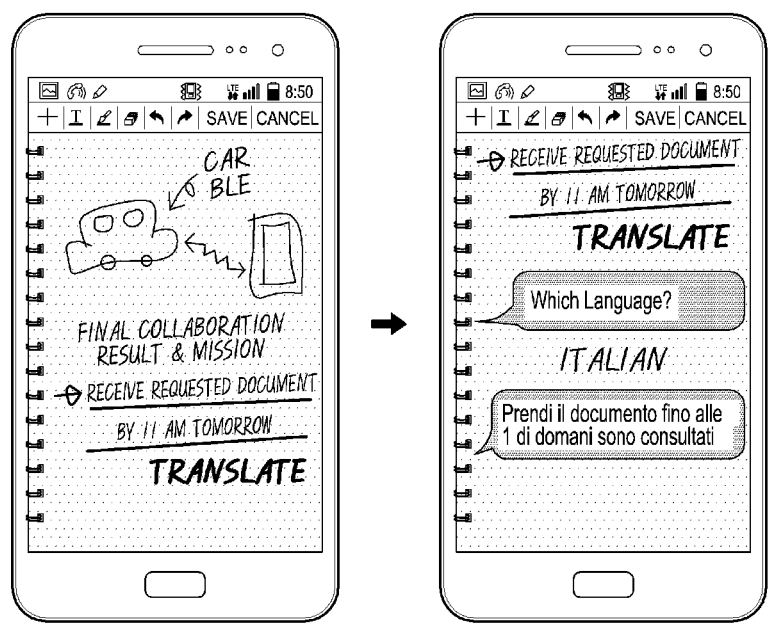

FIG. 17 illustrates a scenario of translating a part of a note written by the memo function in the user terminal according to an embodiment of the present disclosure.

Referring to FIG. 17, the user writes a note on a screen of the user terminal by the memo function (e.g., writing memo). Then the user selects a part of the note using a line, symbol, closed loop, etc. (e.g., triggering). For example, the user selects a sentence 'receive requested document by 11 AM tomorrow' in a part of the note by underlining the sentence.

The user requests translation of the selected contents by writing preset or intuitively recognizable text, for example, 'translate' (e.g., writing command).

The NLI engine that configures a UI based on user-input information recognizes that the user intends to request translation of the selected note contents. Then the NLI engine displays a question asking a language into which the selected note contents are to be translated by a question and answer procedure. For example, the NLI engine prompts the user to enter an intended language by displaying a message 'Which language?' on the screen.

When the user writes 'Italian' as an answer by the memo function, the NLI engine recognizes that 'Italian' is the user's intended language. Then the NLI engine translates the recognized note contents, that is, the sentence 'receive requested document by 11 AM tomorrow' into Italian and outputs the translation. Therefore, the user reads the Italian translation of the requested sentence on the screen.

FIGS. 18, 19, 20, 21, 22 and 23 illustrate scenarios in which after a specific application is activated, another application supporting a memo function is launched and the activated application is executed by the launched application according to an embodiment of the present disclosure.

Figure 18:
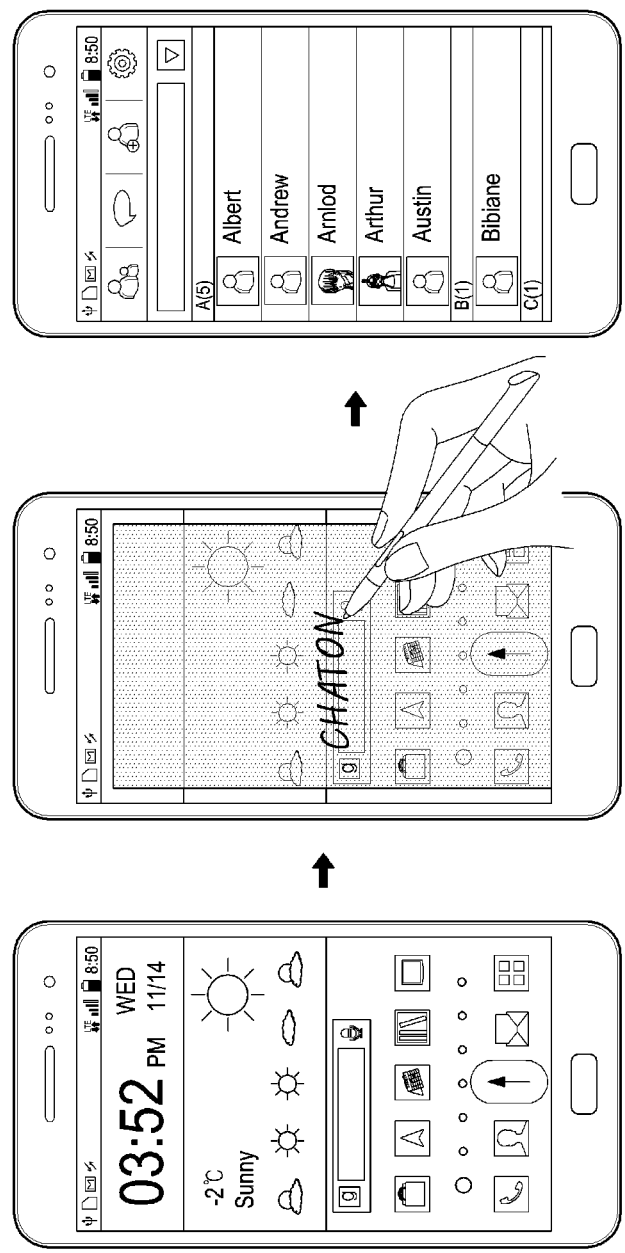

FIG. 18 illustrates a scenario of executing a memo layer on a home screen of the user terminal and executing a specific application on the memo layer according to an embodiment of the present disclosure. For example, the user terminal launches a memo layer on the home screen by executing a memo application on the home screen and then executes an application, upon receipt of identification information about the application (e.g., the name of the application) 'Chaton'.

Figure 19:
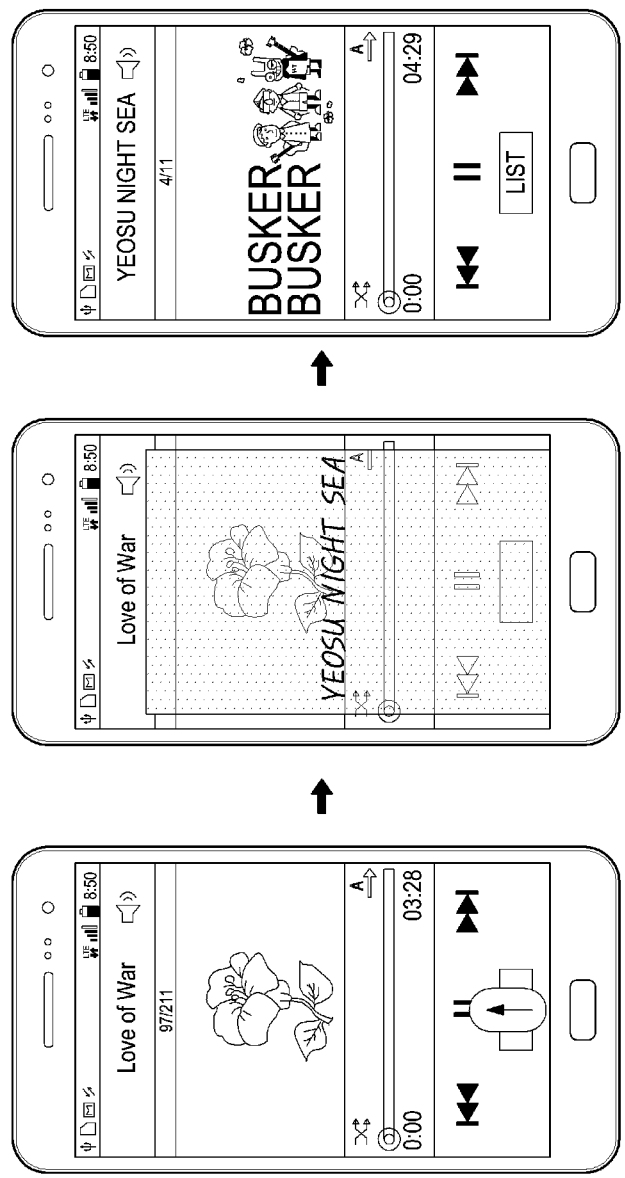

FIG. 19 illustrates a scenario of controlling a specific operation in a specific active application by the memo function in the user terminal according to an embodiment of the present disclosure. For example, a memo layer is launched by executing a memo application on a screen on which a music play application has already been executed. Then, when the user writes down the title of an intended song, 'Yeosu Night Sea" on the screen, the user terminal plays a sound source corresponding to 'Yeosu Night Sea" in the active application.

FIG. 20 illustrates scenarios of controlling a specific active application by the memo function in the user terminal according to an embodiment of the present disclosure. For example, if the user writes a time to jump to, '40:22' on a memo layer during viewing a video, the user terminal jumps to a time point of 40 minutes 22 seconds to play the on-going video. This function may be performed in the same manner while listening to music as well as while viewing a video.

In addition, while reading a book using an e-book application, the user may write a page to jump to, for example, '105' by invoking a memo layer. Then the user terminal jumps to page 105 of the book.

Figure 21:
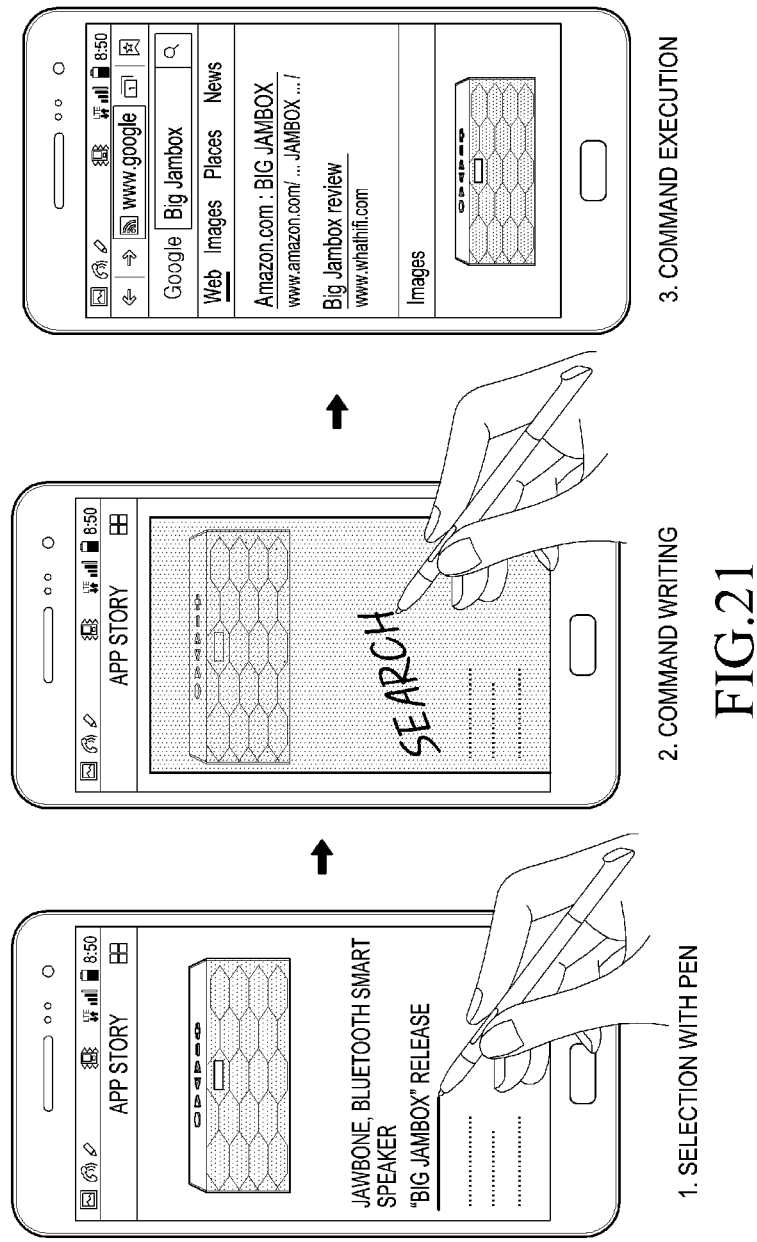

FIG. 21 illustrates a scenario of attempting a search using the memo function, while a Web browser is being executed in the user terminal according to an embodiment of the present disclosure. For example, while reading a specific Web page using the Web browser, the user selects a part of contents displayed on a screen, launches a memo layer, and then writes a word 'search' on the memo layer, thereby commanding a search using the selected contents as a keyword. The NLI engine recognizes the user's intention and understands the selected contents through a natural language process. Then the NLI engine searches using a set search engine using the selected contents and displays search results on the screen.

As described above, the user terminal may operate in a scenario that takes into account both selection and memo function-based information input on a screen that provides a specific application.

Figure 22:
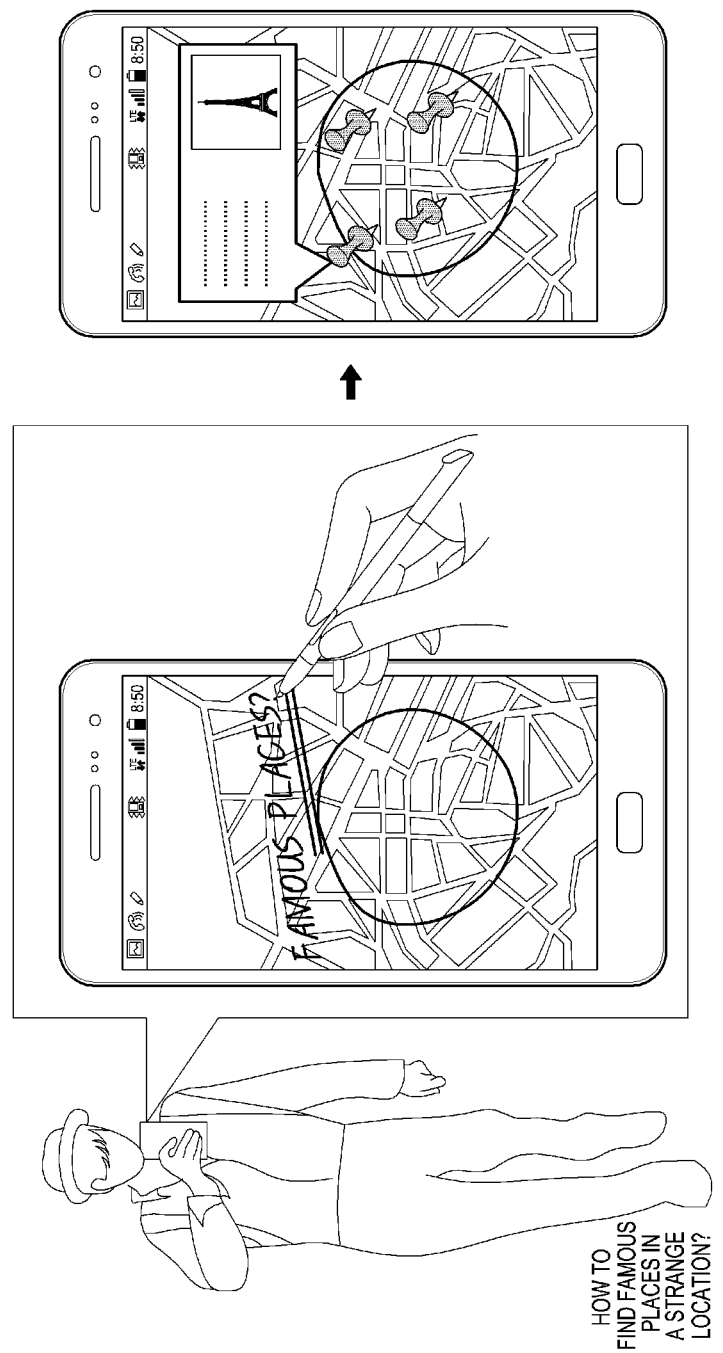

FIG. 22 illustrates a scenario of acquiring intended information in a map application by the memo function according to an embodiment of the present disclosure. For example, the user selects a specific area by drawing a closed loop around the area on a screen of a map application using the memo function and writes information to search for, for example, 'famous place?', thereby commanding search for famous places within the selected area.

When recognizing the user's intention, the NLI engine searches for useful information in its preserved database or a database of a server and additionally displays detected information on the map displayed on the current screen.

Figure 23:
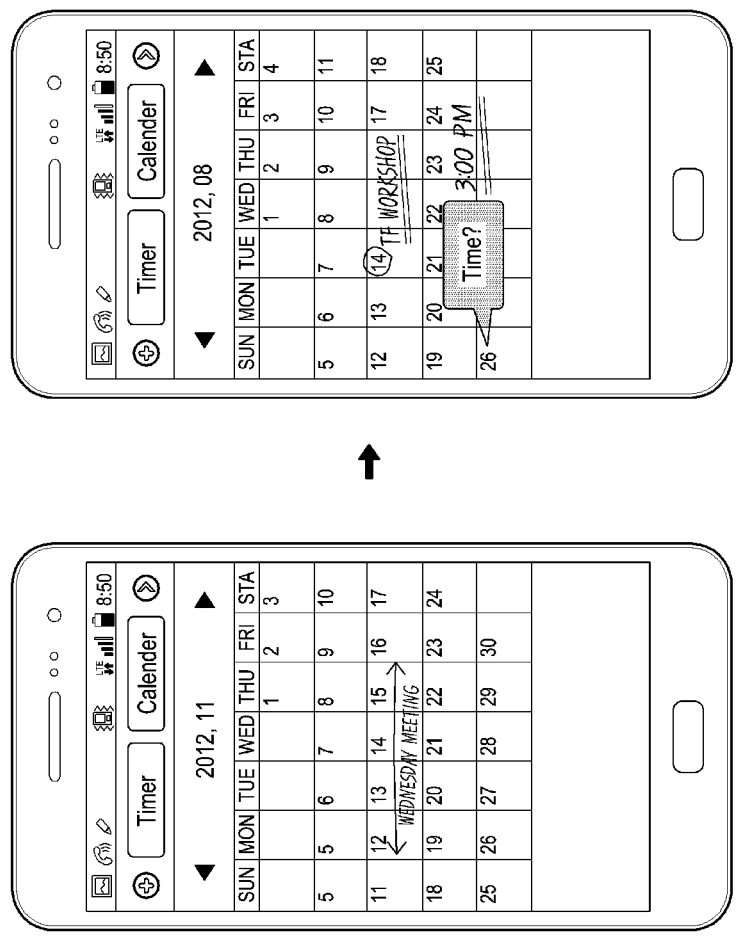

FIG. 23 illustrates a scenario of inputting intended information by the memo function, while a scheduler application is being activated according to an embodiment of the present disclosure. For example, while the scheduler application is being activated, the user executes the memo function and writes information on a screen, as is done offline intuitively. For instance, the user selects a specific date by drawing a closed loop on the scheduler screen and writes a plan for the date. That is, the user selects Mar. 13, 2012 and writes 'TF workshop' for the date. Then the NLI engine of the user terminal 100 requests input of time as additional information. For example, the NLI engine displays a question 'Time?' on the screen so as to prompt the user to enter an accurate time such as '3:00 PM' by the memo function.

Figure 24:
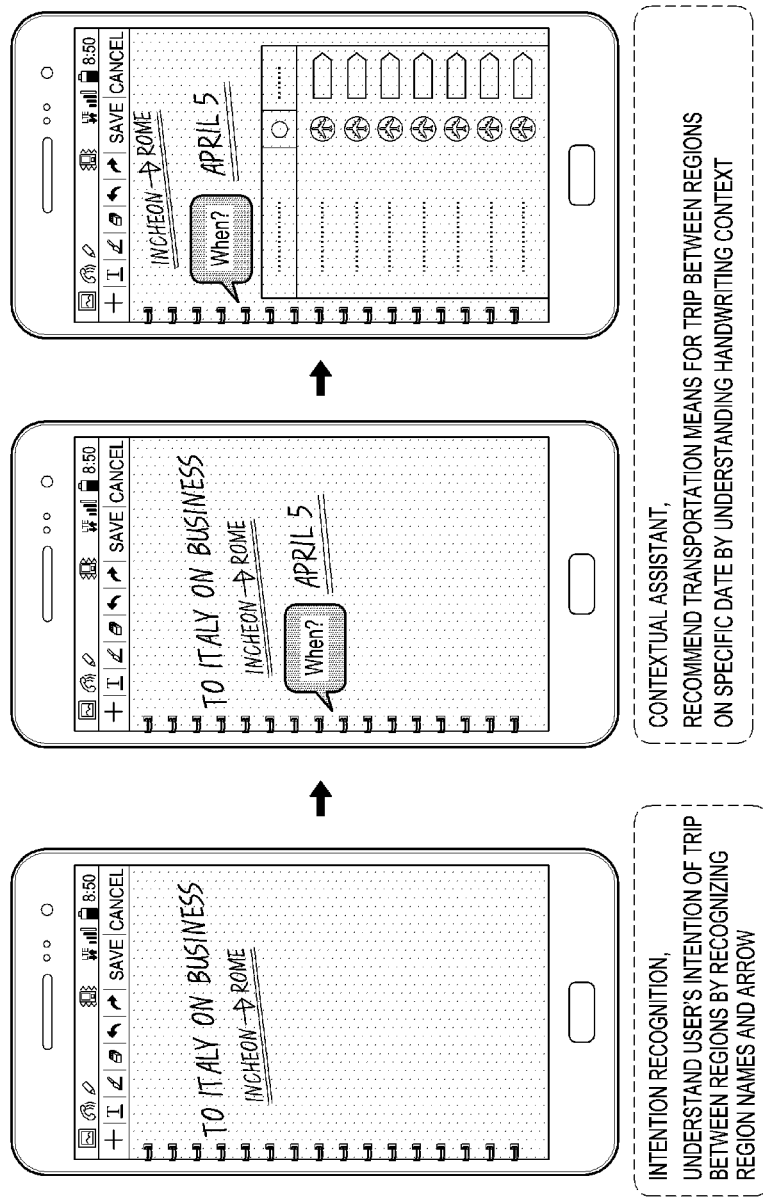
FIGS. 24 and 25 illustrate scenarios related to semiotics according to an embodiment of the present disclosure.
Figure 25:
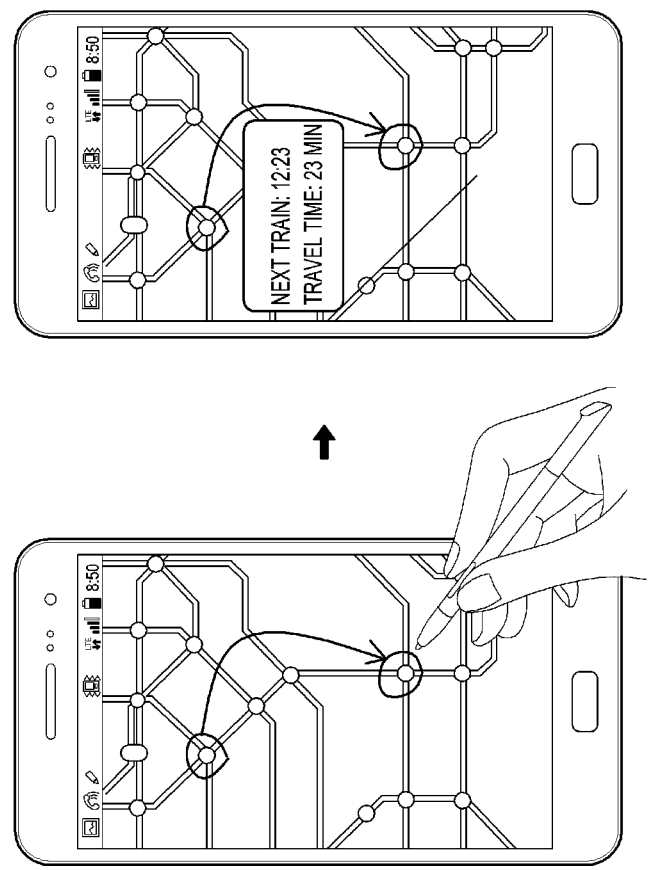

FIGS. 24 and 25 illustrate scenarios related to semiotics according to an embodiment of the present disclosure.

FIG. 24 illustrates an example of interpreting the meaning of a handwritten symbol in the context of a question and answer flow made by the memo function according to an embodiment of the present disclosure. For example, it may be assumed that both notes 'to Italy on business' and 'Incheon→Rome' are written. Since the symbol → may be interpreted as a trip from one place to another, the NLI engine of the user terminal 100 outputs a question asking time, for example, 'When?' to the user.

Further, the NLI engine may search for information about flights available for the trip from Incheon to Rome on a user-written date, April 5 and provide search results to the user.

FIG. 25 illustrates an example of interpreting the meaning of a symbol written by the memo function in conjunction with an activated application according to an embodiment of the present disclosure. For example, the user selects a departure and a destination using a symbol, that is, an arrow in an intuitive manner on a screen on which a subway application is being activated. Then the user terminal may provide information about the arrival time of a train heading for the destination and a time taken to reach the destination by the currently activated application.

As described above, the present disclosure can increase user convenience by supporting a memo function in various applications and thus controlling the applications in an intuitive manner.

The above-described scenarios are characterized in that when a user launches a memo layer on a screen and writes information on the memo layer, the user terminal recognizes the information and performs an operation corresponding to the information. For this purpose, it will be preferred to additionally specify a technique for launching a memo layer on a screen.

For example, the memo layer may be launched on a current screen by pressing a menu button, inputting a specific gesture, keeping a button of a touch pen pressed, or scrolling up or down the screen by a finger. While the memo layer is launched by scrolling up or down a screen in FIGS. 5A and 5B, by way of example, many other techniques are available.

Figure 26:
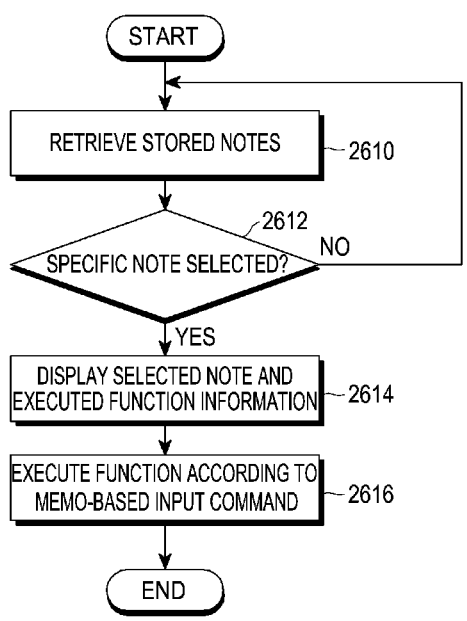
FIG. 26 is a flowchart illustrating a control operation for providing a memo-based UI in a user terminal according to an embodiment of the present disclosure.

FIG. 26 is a flowchart illustrating a control operation for providing a memo-based UI in the user terminal according to an embodiment of the present disclosure.

The contents of notes that the user has written for execution of commands in a memo-based manner and information about dates and times at which the commands have been executed are stored. An operation for retrieving an intended note from the stored note contents and information and executing another function menu regarding the retrieved note is illustrated in FIG. 26.

The operations of FIG. 26 involve retrieving a note for which a specific command has been executed upon user request before the note is recorded, and executing an additional command regarding the retrieved note.

Referring to FIG. 26, upon user request, the user terminal retrieves pre-stored notes and displays the retrieved notes on a screen at operation 2610.

FIGS. 27A to 27C illustrate an example of executing an intended function menu using notes written in the user terminal according to an embodiment of the present disclosure.

Figure 28A:
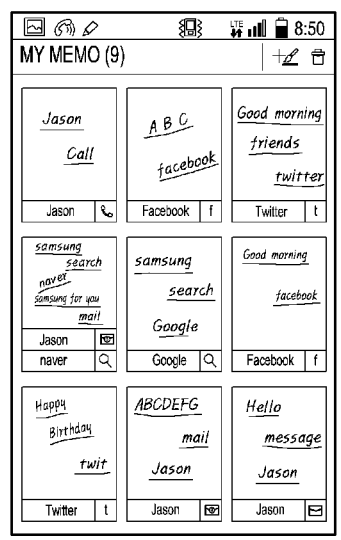
FIGS. 28A and 28B illustrate notes stored in a user terminal, which are displayed on a screen upon user request according to an embodiment of the present disclosure.
Figure 28B:
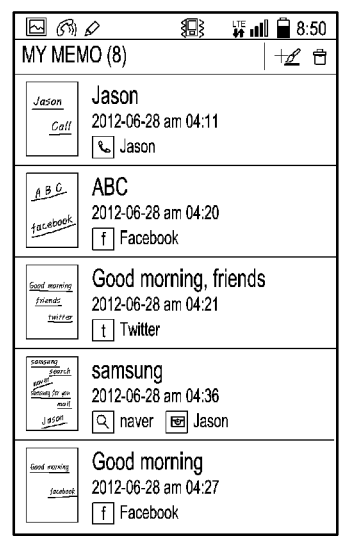

FIGS. 28A and 28B illustrate notes stored in the user terminal, which are displayed on a screen upon user request according to an embodiment of the present disclosure. FIG. 28A illustrates an example of displaying stored notes in the form of thumbnails on a screen and FIG. 28B illustrates an example of displaying stored notes in the form of a list on a screen.

Information about saved times, recognized contents, and information about at least one executed command are displayed commonly in FIGS. 28A and 28B, although in different forms.

For example, a note displayed in the first row and the second column in FIG. 28A (the second-listed note in FIG. 28B) reveals that a function menu "upload of contents 'ABC' to Facebook" was executed.

As noted from FIGS. 28A and 28B, if a plurality of function menus have been executed regarding one recognized note, information about an executed command corresponding to each function menu is recorded for the note.

For example, a note displayed in the second row and the first column in FIG. 28A (the fourth-listed note in FIG. 28B) reveals that a function menu 'search in Naver' and then a function menu 'send mail to Jason' were executed regarding recognized contents 'SAMSUNG'.

In FIGS. 28A and 28B, icons representing executed function menus are additionally displayed.

Returning back to FIG. 26, at operation 2612, the user terminal monitors user selection of one of the displayed notes. Upon user selection of one of the displayed notes, the user terminal displays stored information about the selected note on the screen at operation 2614. The displayed information includes a command executed regarding the contents of the note and additional information input to execute a function menu corresponding to the command as well as the contents of the note written by the user at operation 2616.

For example, when the user selects a note displayed in the second row and the third column from among notes displayed on a screen in FIG. 27A, the selected note is displayed on the screen. FIG. 27B illustrates an example of displaying the selected note on the screen in the user terminal.

As illustrated in FIG. 27B, in addition to the contents of the note written by the user, contents selected from the contents of the note by the user, a note written to input a command to process the selected contents, and additional information input to execute the command are displayed.

Thus, the user is aware from the contents displayed on the screen that "a function menu to send contents 'galaxy note premium suite' to 'Gwang Min-BYUN'" was executed.

The user terminal determines whether the user has requested another function menu for the contents displayed on the screen. If the user has requested another function menu for the displayed contents, the user terminal performs an operation corresponding to the requested function menu.

For example, if the user selects a whole or part of the contents displayed on the screen by a first input form, the user terminal recognizes the selected whole or part of the contents as note contents to be processed. The first input form may be defined in various manners. For example, the first input form may be defined as an underline that is drawn under contents with an electronic pen.

Subsequently, when the user selects a part of the contents displayed on the screen by a second input form, the user terminal recognizes the selected part of the displayed contents as a command requesting execution of a specific function menu. The part of the contents selected by the second input form may be an additional note that the user writes by the memo function, after the specific selected note is displayed on the screen.

Referring to FIG. 27C, the user writes a note 'search' and then selects the new note 'search' by the second input form, by way of example. For instance, the second input form may be defined as an underline that the user draws under note contents to be selected after staying at the starting point of the note contents for a predetermined time (e.g., 0.6 seconds).

Upon recognition of the new command, the user terminal processes the selected note contents by a function menu corresponding to the recognized new command. In the above example, the user terminal executes "a function menu to perform a search operation regarding the note 'galaxy note premium suite' and displays the result of executing the function menu on the screen. If the user terminal needs additional information for the search operation, the user terminal may request the user to input the additional information. For example, the user terminal asks the user a search engine to use for executing the search function menu and receives information indicating a search engine to be used from the user. Herein, the user may input the information indicating a search engine by the memo function.

Figure 29:
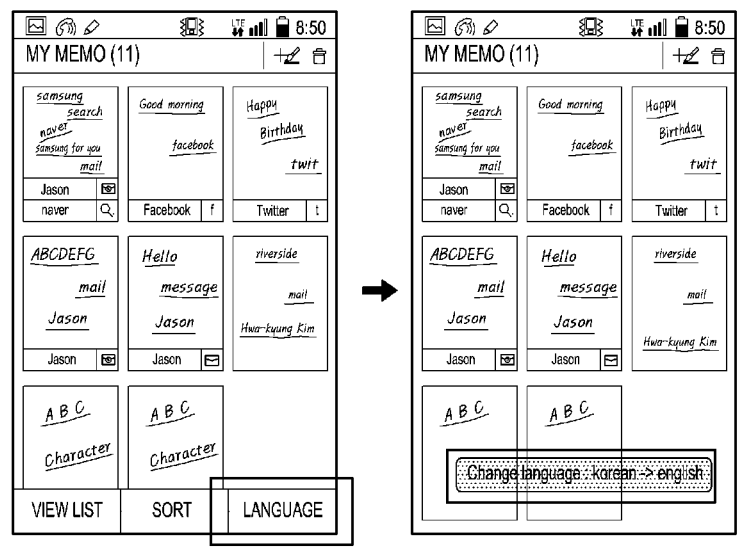
FIG. 29 illustrates another example of displaying stored notes on a screen in a user terminal according to an embodiment of the present disclosure.

FIG. 29 illustrates another example of displaying stored notes on a screen in the user terminal according to an embodiment of the present disclosure.

Referring to FIG. 29, a language change function is added to the memo function of the present disclosure, by way of example. For example, it is assumed that a language to read a note has been set to Korean. When the user selects a function menu 'language' from among function menus displayed on the screen, the user terminal changes 'Korean' to 'English' as a language to read a note. Each time the user selects the function menu on the screen, the languages may be changed alternately.

It is also possible to implement hybrid recognition without changing a recognition mode. That is, the hybrid recognition may be available without changing a recognition mode according to a handwriting recognition engine.

Figure 30:
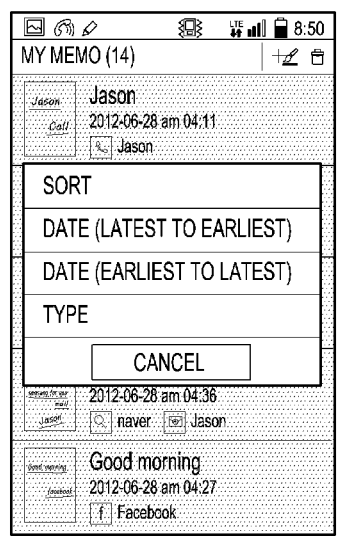
FIG. 30 illustrates an example of setting a sorting order for displaying stored notes on a screen in a user terminal according to an embodiment of the present disclosure.

FIG. 30 illustrates an example of setting a sorting order for displaying stored notes on a screen in the user terminal according to an embodiment of the present disclosure.

Referring to FIG. 30, notes displayed on a screen may be sorted by date in descending order), date in ascending order), type, etc. upon user request. For example, when the user requests sorting of the displayed notes in an ascending date order, the user terminal sorts the stored notes in the order of latest to earliest on the screen.

Figure 31:
FIG. 31 illustrates an example of selectively deleting stored notes in a user terminal according to an embodiment of the present disclosure.

FIG. 31 illustrates an example of selectively deleting stored notes in the user terminal according to an embodiment of the present disclosure.

Referring to FIG. 31, the user terminal displays a screen for deleting stored notes, upon user request. That is, the user terminal displays the stored notes in the form of thumbnails and additionally check boxes for the respective notes in order to allow the user to determine whether to delete or not on a note basis (indicated by reference numeral ③). For example, a check box is activated, upon user selection. That is, as the selected check box is changed to be visually distinguished (e.g., a red color), the user can confirm the note that the user has selected to delete.

Or the outline of a thumbnail corresponding to the selected note to be deleted may be changed to be visually distinguished (e.g., a red color) so that the user can readily confirm the selected note.

A button for requesting deletion of a selected note (indicated by reference numeral ①) and a button for requesting switching to a view screen after ending a note deletion function (indicated by reference numeral ②) are displayed at the top of the screen displayed for note deletion.

As illustrated in FIG. 31, a note in the first row and the first column and a note in the second row and the third column are selected for deletion.

As is apparent from the above description, the present disclosure can lead to active use of a memo function using an electronic pen in a user terminal. In addition, as an intuitive interface is provided to a user, the user can use functions supported by the user terminal comfortably.

It will be understood that the embodiments of the present disclosure can be implemented in hardware, software, or a combination thereof. The software may be stored in a volatile or non-volatile memory device like a Read Only Memory (ROM) irrespective of whether data is deletable or rewritable, in a memory like a Random Access Memory (RAM), a memory chip, a device, or an integrated circuit, or in a storage medium to which data can be recorded optically or magnetically and from which data can be read by a machine (e.g. a computer), such as a Compact Disc (CD), a Digital Versatile Disc (DVD), a magnetic disk, or a magnetic tape.

The UI apparatus in a user terminal and a method for supporting the same according to the present disclosure can be implemented in a computer or portable terminal that has a controller and a memory, and the memory is an example of a non-transitory machine-readable storage medium suitable for storing a program or programs including commands to implement the embodiments of the present disclosure. Accordingly, the present disclosure includes a program having a code for implementing the apparatuses or methods defined by the claims and a non-transitory storage medium readable by a machine that stores the program. The program can be transferred electronically through a medium such as a communication signal transmitted via a wired or wireless connection, and the equivalents of which are included in the present disclosure.

Further, The UI apparatus in a user terminal and a method for supporting the same according to the present disclosure can receive the program from a program providing device connected by cable or wirelessly and store it. The program providing device may include a memory for storing a program with commands requesting implementation of the method of the present disclosure in the UI apparatus and information used to implement the method, a communication module for communicating with the UI apparatus wirelessly or by wire, and a controller for transmitting a program to the UI apparatus automatically or upon request of the UI apparatus.

For example, an overall operation of assessing a user's intention based on a recognized result of a recognition engine that configures a UI and providing the result of performing a process corresponding to the user's intention to a user is performed in the user terminal in the above embodiments of the present disclosure.

However, the user terminal may perform a function for the present disclosure in conjunction with a server accessible through a network. For example, the user terminal may provide a recognized result of the recognition engine to a specific server through the network and the specific server may assess the user's intention based on the received recognized result and provide the assessment result to the user terminal. If additional information is required regarding assessment of the user's intention only based on the recognized result or regarding processing the assessed user's intention, the additional information may be acquired by a question and answer procedure with the user terminal.

In addition, the user can selectively limit the operations of the present disclosure to the user terminal or extend the operations of the present disclosure to interworking with the server over the network by adjusting settings of the user terminal.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A user interface (UI) method in a user terminal supporting a handwriting-based memo function, the method comprising:
    retrieving a note content from a plurality of note content stored in the user terminal;
    displaying the retrieved note content in an initial note content on a screen;
    selecting a whole or part of the displayed initial note content by a first input form;
    determining a command to process the selected whole or part of the displayed initial note content based on an additional note content written on the screen by the memo function; and
    processing the selected whole or part of the displayed initial note content according to the command,
    wherein the additional note content includes a first additional note content corresponding to the command and a second additional note content indicating to perform the command, and
    wherein the second additional note content is input to the screen based on a second input form, which is predetermined different from the first input form.

2. The method of claim 1, wherein, upon receipt of a request from the user, the displayed initial note content or the selected whole or part of the displayed initial note content is stored and mapped to function information corresponding to the command.

3. The method of claim 2,
    wherein the first input form is predetermined to be an underline drawn under the selected whole or part of the displayed initial note content, and
    wherein the second input form is predetermined to be an underline drawn under the additional note content, after a time delay beginning at a starting point of the additional note content.

4. The method of claim 3, wherein an icon representing a command input waiting state is displayed during the time delay.

5. The method of claim 4, wherein, when the additional note content to be determined as the command is underlined, the icon representing the command input waiting state is changed to an icon corresponding to a command recognized by the underlined additional note content.

6. The method of claim 2, wherein the stored plurality of note content is classified by function information.

7. A non-transitory machine-readable storage medium having stored therein a computer program for executing the method of claim 1.

8. A user interface (UI) apparatus in a user terminal supporting a handwriting-based memo function, the apparatus comprising:
    a touch panel; and
    a command processor, wherein the command processor is configured to:
        retrieve a note content from a plurality of note content stored in the user terminal,
        control the touch panel to display the retrieved note content in an initial note content,
        select a whole or part of the displayed initial note content by a first input form,
        determine a command to process the selected whole or part of the displayed initial note content based on an additional note content written on the touch panel by the memo function; and
        process the selected whole or part of the displayed initial note content according to the command,
    wherein the additional note content includes a first additional note content corresponding to the command and a second additional note content indicating to perform the command, and
    wherein the second additional note content is input to the screen based on a second input form, which is predetermined different from the first input form.

9. The apparatus of claim 8, wherein, upon receipt of a request from the user, the command processor is further configured to store the displayed initial note content or the selected whole or part of the displayed initial note content corresponding to the command.

10. The apparatus of claim 9,
    wherein the first input form is predetermined to be an underline drawn under the selected whole or part of the displayed initial note content, and
    wherein the second input form is predetermined to be an underline drawn under the additional note content, after a time delay beginning at a starting point of the additional note content.

11. The apparatus of claim 10, wherein an icon representing a command input waiting state is displayed during the time delay.

12. The apparatus of claim 11, wherein, when the additional note content to be determined as the command is underlined, the icon representing the command input waiting state is changed to an icon corresponding to a command recognized by the underlined additional note content.

13. The apparatus of claim 9, wherein the stored plurality of note content is classified by function information.

* * * * *